(12) United States Patent
Takekawa et al.

(10) Patent No.: US 6,965,570 B2
(45) Date of Patent: Nov. 15, 2005

(54) COMMUNICATION CONTROLLER AND COMPUTER PRODUCT

(75) Inventors: Ikuo Takekawa, Kawasaki (JP); Tatsumi Kakiuchi, Kawasaki (JP); Eiji Muzunuma, Kawasaki (JP); Takeshi Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 595 days.

(21) Appl. No.: 09/725,618

(22) Filed: Nov. 29, 2000

(65) Prior Publication Data

US 2001/0011010 A1  Aug. 2, 2001

(30) Foreign Application Priority Data

Jan. 31, 2000 (JP) .............................. 2000-023167

(51) Int. Cl.[7] .............................................. H04Q 7/20
(52) U.S. Cl. ...................... 370/241; 455/423; 455/445
(58) Field of Search ........................ 455/7–10, 67.11, 455/226.2, 423–425, 462–464, 550.1, 551, 455/552.1, 553.1, 515, 557, 558, 445

(56) References Cited

U.S. PATENT DOCUMENTS

| | | | |
|---|---|---|---|
| 4,989,230 A * | 1/1991 | Gillig et al. .............. | 455/552.1 |
| 5,203,012 A | 4/1993 | Patsiokas et al. .......... | 455/34.1 |
| 5,428,671 A | 6/1995 | Dykes et al. ................. | 379/93 |
| 5,737,703 A * | 4/1998 | Byrne ......................... | 455/442 |
| 5,784,362 A * | 7/1998 | Turina ......................... | 370/321 |
| 5,835,721 A * | 11/1998 | Donahue et al. ............ | 709/224 |
| 5,884,190 A | 3/1999 | Lintula et al. .............. | 455/557 |
| 5,987,334 A * | 11/1999 | Kaku ....................... | 455/552.1 |
| 6,327,470 B1 * | 12/2001 | Ostling ....................... | 455/437 |
| 6,400,964 B1 * | 6/2002 | Zicker et al. ............ | 455/553.1 |
| 6,421,538 B1 * | 7/2002 | Byrne ......................... | 455/441 |
| 6,445,921 B1 * | 9/2002 | Bell ......................... | 455/426.1 |
| 6,477,139 B1 * | 11/2002 | Anderson et al. ........... | 370/216 |
| 6,625,446 B1 * | 9/2003 | Mochizuki .................. | 455/421 |

FOREIGN PATENT DOCUMENTS

GB    2 285 558    7/1995

* cited by examiner

*Primary Examiner*—Simon Nguyen
(74) *Attorney, Agent, or Firm*—Greer, Burns & Crain, Ltd.

(57) ABSTRACT

One connection unit is connected to each radio communication line. There are a plurality of radio communication lines. Radio-field intensity of each radio communication line is monitored. A radio communication line whose radio-field intensity is equal to or higher than a threshold is decided and data communication is established using this radio communication line and corresponding connection unit.

6 Claims, 20 Drawing Sheets

FIG.7

| CONNECTION DEFINITION NAME | CONNECTION-DESTINATION TELEPHONE NUMBER | USER NAME | PASSWORD | GATEWAY IP ADDRESS | GATEWAY PORT NUMBER | CONNECTION MEANS |
|---|---|---|---|---|---|---|
| CONNECTION 1 | xxx-xxxx | User1 | Pass1 | 111.222.111.222 | 8090 | PORTABLE TELEPHONE 1 |
| CONNECTION 2 | yyy-yyyy | User2 | Pass2 | 333.444.333.444 | 8090 | PHS1 |
| CONNECTION 3 | zzz-zzzz | User3 | Pass3 | 555.666.555.666 | 8090 | PHS2 |

113

COMMUNICATION CONTROLLER AND COMPUTER PRODUCT

FIELD OF THE INVENTION

The present invention relates to a communication controller capable of continuously resuming data communication using a plurality of radio lines even after the data is interrupted and a computer-readable recording medium storing a control program.

BACKGROUND OF THE INVENTION

Recently, the performance of computers in general is increasing and the size and weight is decreasing. Accordingly, the use of portable computers or mobile computers (hereafter referred to as information terminal unit) is spreading. Moreover, many types of communication means likes LAN (Local Area Network), ordinary public lines, radio lines {portable telephone line or PHS (Personal Handy phone System) line} are available for accessing a server using an information terminal unit. Because of the availability of such an environment, it has become very easy for a user to readily execute data communication with a server using his information terminal unit and a communication line.

However, the conventional mobile communication environment has problems as follows. The operability is very bad because many times the line suddenly gets disconnected due to deterioration of received radio-field intensity. Further, depending upon the type of the line, the operation is different. Because of such problems in the conventional mobile communication environment, means or a method for effectively solving the above problem is earnestly desired.

Information terminal units that can be connected to the office's server from outside using a line are finding great use in the business. The information terminal unit of this type is provided with a PCMCIA (Personal Computer Memory Card International Association) card slot into which a PCMCIA card such as a portable-telephone card or PHS card or the like is inserted.

A portable-telephone card serves as an interface between an information terminal unit and a portable-telephone terminal, which is inserted into a PCMCIA card slot when performing data communication between an information terminal unit and a server through a portable-telephone line by using a portable-telephone terminal. However, a PHS card serves as an interface between an information terminal unit and a PHS terminal, which is inserted into a PCMCIA card slot when performing data communication between an information terminal unit and a server through a PHS line.

In the case of the above configuration, a user confirms that a received radio-field intensity is kept at a communicable level through a level meter indicated on a display of a portable-telephone terminal (or PHS terminal) and then, inserts a portable-telephone card (or PHS card) into a PCMCIA card slot of an information terminal unit. Thereby, the information terminal unit is connected to the portable-telephone terminal (or PHS terminal) through the portable-telephone card (or PHS card).

Under the above state, when a start key is operated by an operator, the information terminal unit is connected to a server via a portable-telephone line (or PHS line) and data communication is performed with the server. Moreover, a connector section used for a LAN cable is provided for the information terminal unit in addition to the above PCMCIA card slot. Therefore, by connecting a LAN cable to the information terminal unit through the connector section, it is possible to perform data communication with the server through a LAN.

As described above, a conventional information terminal unit uses a radio line (portable-telephone line or PHS line). Therefore, a line is disconnected because a received radio-field intensity is deteriorated nearby a radio-wave shielding body such as a building or the like and transferred data is canceled. In this case, a user must move to a place at a high received radio-field intensity checking a level meter of a display and then, retry data communication. Therefore, the operability is bad. In this case, because data processing is executed from the beginning after retrying the data communication, there has been a problem that the processing time required for the data communication is increased when including the processing time before line disconnection. The above problem also occurs when data communication is interrupted through user's operation and then resumed.

Moreover, when considering a utilization mode of a conventional information terminal unit, a state also occurs that data communication is interrupted temporally by a user because a received radio-field intensity may be deteriorated while the data is performed through a PHS line and thereafter, the data is resumed through another line (e.g., a portable-telephone line). Also in this case, it is necessary to retry data communication through a portable-telephone line. Therefore, operability is bad. Moreover, the data transferred through a PHS line is canceled and protocols are changed from a communication protocol for a PHS line to a communication protocol for a portable-telephone line. Thereby, the processing time required for data communication is increased.

Moreover, in the case of a conventional information terminal unit, a user must confirm a received radio-field intensity and perform the operation for data communication whenever a portable-telephone card or a PHS card is inserted. Therefore, there is a problem that it is impossible to correspond to the needs for automation.

SUMMARY OF THE INVENTION

It is an object of this invention to provide a communication controller capable of improving the operability and shortening the processing time required for data communication and a computer-readable recording medium storing a communication control program.

The communication controller according to this invention comprises a plurality of connection units which can be connected to a plurality of radio communication lines one-to-one. Further, a radio-field intensity acquisition is provided for acquiring the radio-field intensity of each of the radio communication lines. Further, a selection unit is provided for selecting a connection unit having a radio-field intensity equal to or higher. Further, a control is provided for performing data communication using the selected connection unit and a radio communication line.

Thus, a connection unit whose radio-field intensity is equal to or higher than a threshold is selected and data communication is performed using this connection unit and a radio communication line. Accordingly, it is possible to prevent data communication from being interrupted due to deterioration of a radio-field intensity and shorten the processing time.

Other objects and features of this invention will become apparent from the following description with reference to the accompanying drawings.

BRIEF DESCRIPTION OF THE DRAWINGS

FIG. 7 is an illustration showing the connection control table 113 shown in FIG. 4;

DESCRIPTION OF THE PREFERRED EMBODIMENTS

One preferred embodiment of a communication controller, and a computer-readable recording medium storing a communication control program of the present invention is described below in detail by referring to the accompanying drawings.

Figure 1:
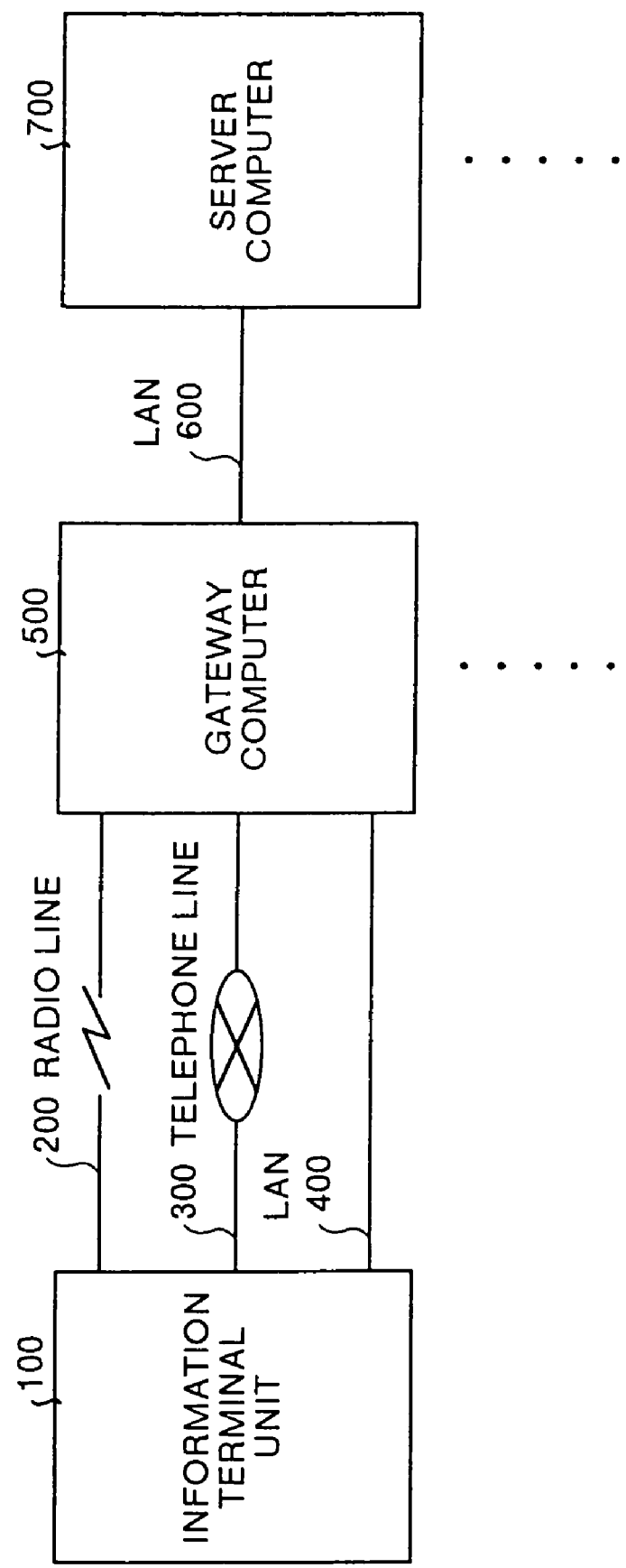
FIG. 1 is a block diagram showing a schematic configuration of an embodiment of the present invention.
Figure 2:
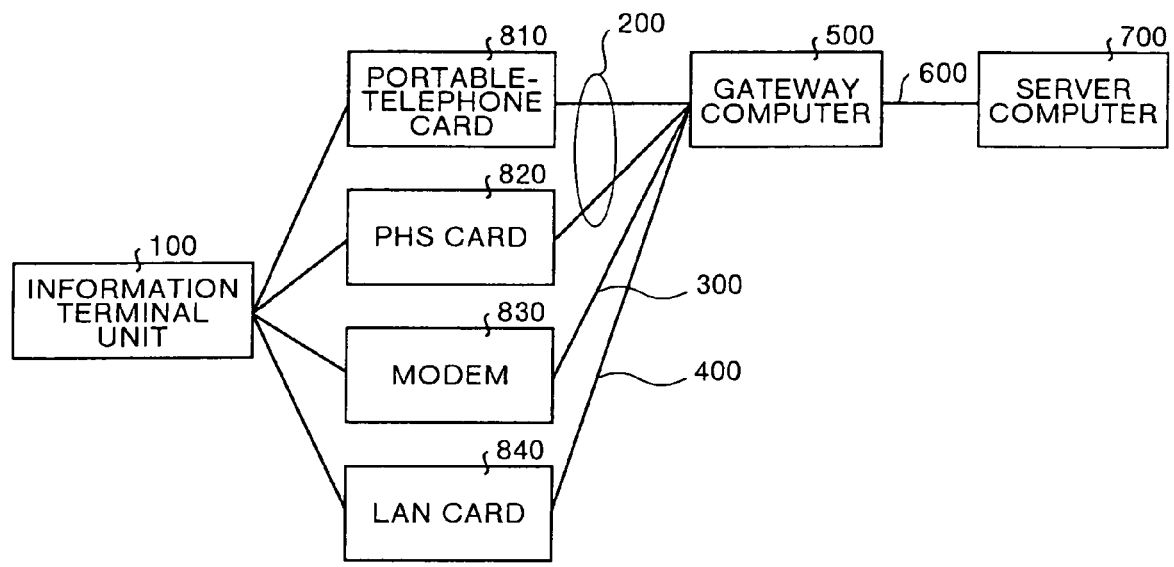
FIG. 2 is another block diagram showing a schematic configuration of the embodiment.

FIG. 1 and FIG. 2 are block diagrams showing a schematic configuration of the embodiment of the present invention. The information terminal unit 100 shown in FIG. 1 is a portable mobile computer which can perform data communication by accessing a server computer 700 via a radio line 200 (or telephone line 300 or LAN 400), a gateway computer 500, and a LAN 600. Specifically, the information terminal unit 100 has a function for transmitting data to the server computer 700 and a function for receiving data from the server computer 700.

The radio line 200 uses a portable-telephone line or PHS line including a radio transmission line between the information terminal unit 100 and a radio base station (not illustrated). The radio line 200 is used for data communication using a portable-telephone terminal or PHS terminal at a visit destination by a user. The telephone line 300 is a general public line {e.g. ISDN (Integrated Services Digital Network)} comprising a cable transmission line. The telephone line 300 is used for data communication using a public telephone corresponding to ISDN at a visit destination. The LAN 400 is a cable transmission line laid in a company and is used for data communication in the company.

The portable-telephone card 810, PHS card 820, modem 830, or LAN card 840 shown in FIG. 2 is applied to the information terminal unit 100, corresponding to the kinds of lines for data communication. The portable-telephone card 810 shown in FIG. 2 is used to perform data communication through the radio line 200 (in this case, a portable-telephone line is used; refer to FIG. 1) and serves as an interface between portable-telephone terminal (not illustrated) and the information terminal unit 100.

The PHS card 820 is used to perform data communication through the radio line 200 (in this case, a PHS line is used; refer to FIG. 1) and serves as an interface between a PHS terminal (not illustrated) and the information terminal unit 100. The modem 830 is used to perform data communication through the telephone line 300 (refer to FIG. 1) and serves as an interface with the telephone line 300. Specifically, the modem 830 is connected to a public telephone (not illustrated) corresponding to ISDN through a modem cable (not illustrated). The LAN card 840 is used to perform data communication through the LAN 400 (refer to FIG. 1) and serves as an interface between the information terminal unit 100 and LAN 400.

The gateway computer 500 is set between the LAN 600 and any one of the radio line 200, telephone line 300, and LAN 400 and performs the control for transferring data between both networks. Specifically, the gateway computer 500 converts a data format, address, and communication protocol. The server computer 700 is connected to the LAN 600 and performs data communication with the information terminal unit 100.

Figure 3:
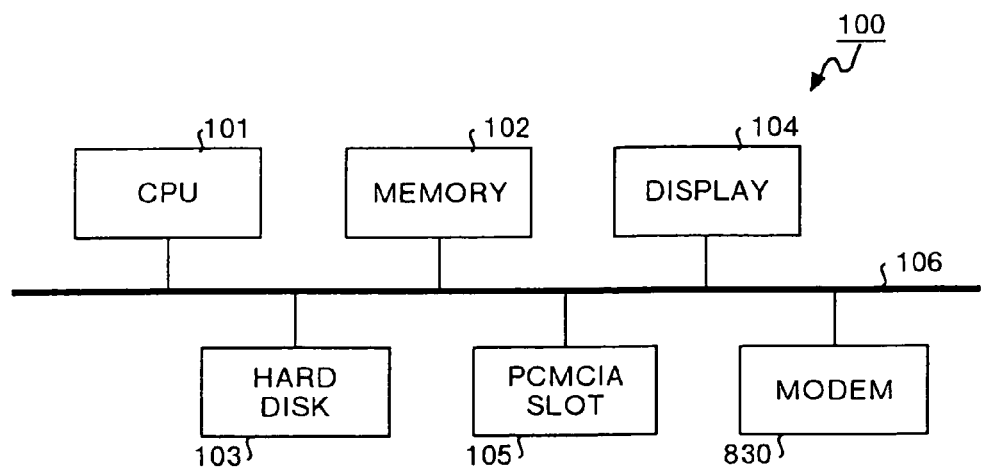
FIG. 3 is a block diagram showing a hardware configuration of the information terminal unit 100 shown in FIG. 1.

Then, a hardware configuration of the above information terminal unit 100 is described below by referring to FIG. 3. In FIG. 3, a CPU (Central Processing Unit) 101 performs communication control and input/output control. A memory 102 stores various data values and operation parameters. A hard disk 103 stores various programs to be mentioned later, data to be transmitted, and received data. The portable-telephone card 810, PHS card 820, or LAN card 840 shown in FIG. 2 is inserted into a PCMCIA slot 105 under data communication. A display 104 displays a data control screen or the like for controlling data communication in accordance with the control by the CPU 101. The modem 830 is used for data communication using the telephone line 300. A bus 106 connects sections of a controller to each other.

Figure 4:
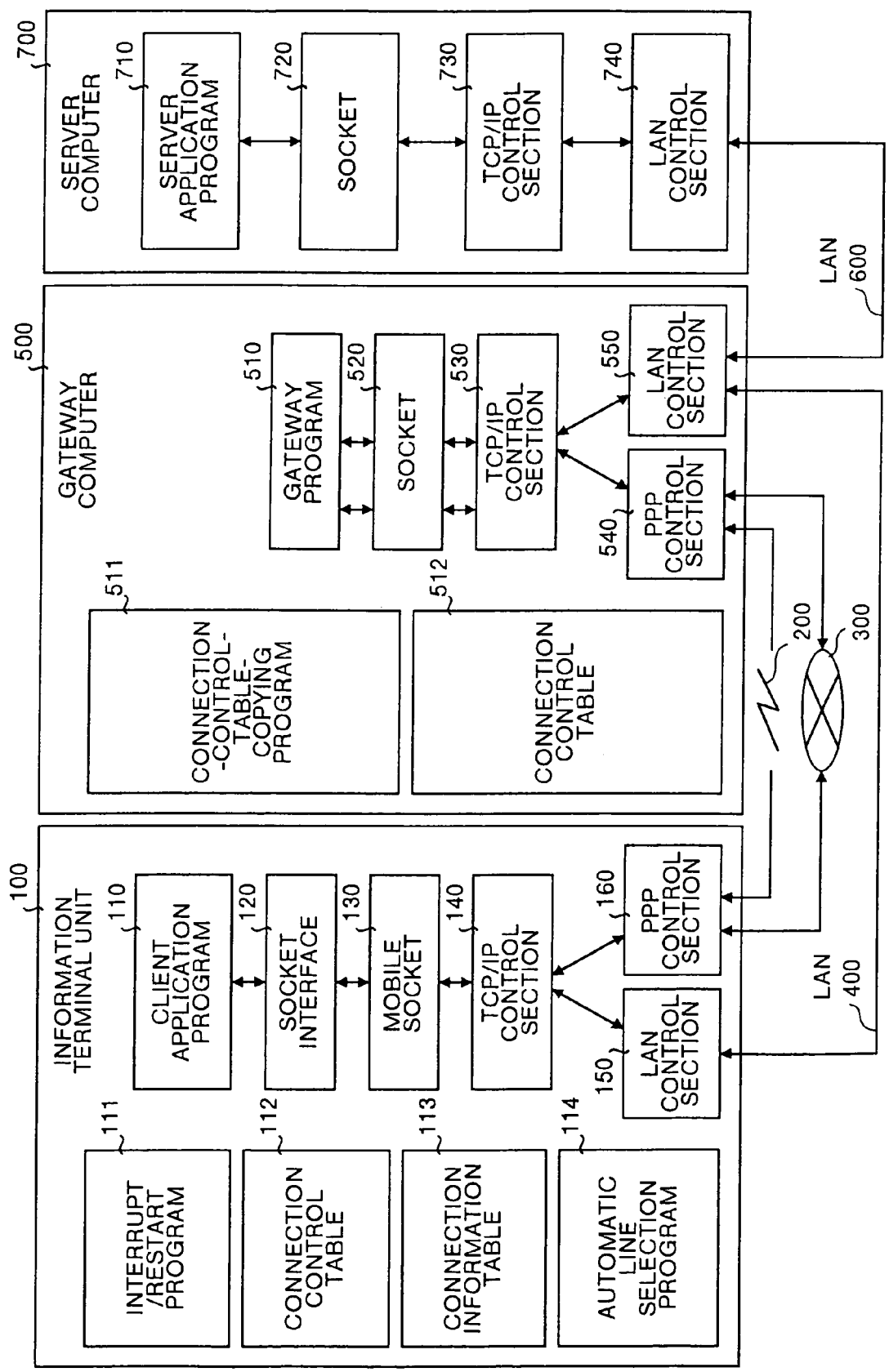
FIG. 4 is a block diagram showing a configuration of the embodiment in FIG. 1.

FIG. 4 is a block diagram of a configuration of the embodiment taken from the viewpoint of software. Therefore, each component shown in FIG. 4 corresponds to the function of each component shown in FIG. 3. In FIG. 4, a portion corresponding to a portion in FIG. 1 is provided with the same symbol. In the case of an information terminal unit 100 shown in FIG. 4, a client application program 110 executes data communication with a server computer 700, which is stored in the hard disk 103 (refer to FIG. 3).

A socket interface 120 is referred to as Winsock that is a program interface for using TCP/IP (Transmission Control Protocol/Internet Protocol). A mobile socket 130 is an interface for using a TCP, which realizes data communication by setting a call between the socket 130 and a socket 520 to be mentioned later.

A TCP/IP control section 140 performs communication control in accordance with the TCP/IP. A LAN control section 150 controls data communication when the LAN 400 is selected as a data communication line. A PPP (Point to Point Protocol) control section 160 controls data communication in accordance with the PPP when the radio line 200 or telephone line 300 is selected as a data communication line.

An interrupt/restart program 111 is a program for controlling interrupt/restart of data communication, which is stored in the hard disk 103 (refer to FIG. 3). A connection control table 112 is a table for controlling the connection between the information terminal unit 100 and the gateway computer 500, which is stored in the hard disk 103 (refer to FIG. 3).

Figure 6:
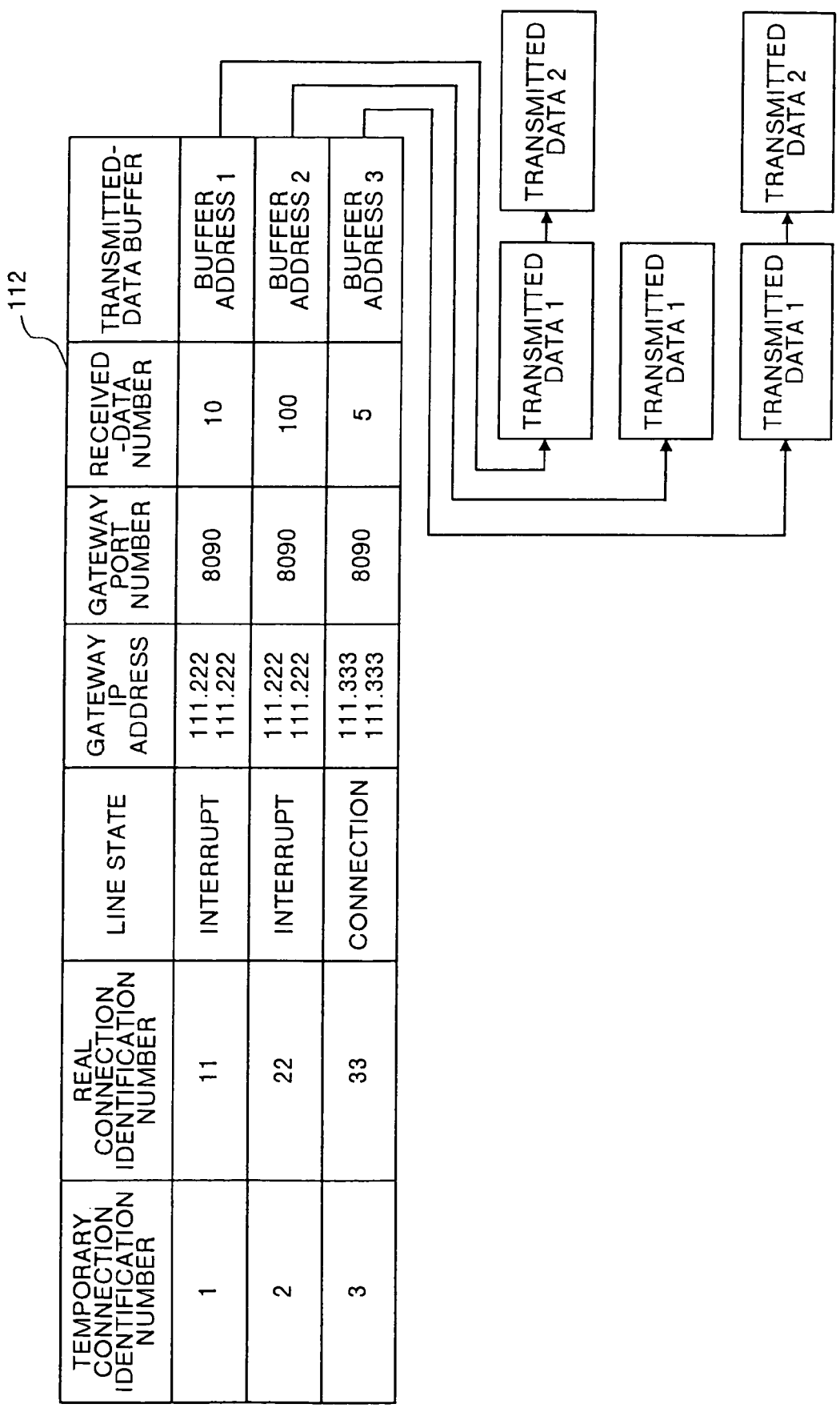
FIG. 6 is an illustration showing the connection control table 112 shown in FIG. 4.

As shown in FIG. 6, the connection control table 112 is constituted of such fields as "temporary connection identification number", "real connection identification number", "line state", "gateway IP address", "gateway port number", "received-data number", and "transmitted-data buffer". The "real connection identification number" is a number for identifying the connection between the mobile socket 130 and the socket 520. The "temporary connection identification number" denotes a unique number related to the real connection in the mobile socket 130.

"Line state" denotes a state (interruption or connection) of a line (radio line 200, telephone line 300, or LAN 400). "Gateway IP address" denotes an IP address of the gateway computer 500 used for data communication. In FIG. 4, only one gateway computer 500 is shown. However, a plurality of gateway computers may be actually connected to the LAN 600.

"Gateway port number" denotes a number for a gateway computer used for data communication. "Received-data number" denotes a number for identifying the data transmitted from the gateway computer 500 (server computer 700) to the information terminal unit 100. "Transmitted-data buffer" denotes an address of a transmitted-data buffer (not illustrated) for storing a number for the data transmitted from the information terminal unit 100 to the gateway computer 500 (server computer 700). The address corresponds to the transmitted-data number.

A connection information table 113 shown in FIG. 4 is a table set by a user every line usable for data communication, which is constituted of information necessary for line connection. Specifically, as shown in FIG. 7, the connection information table 113 is constituted of such fields as "connection definition name", "connection-destination telephone number", "user name", "password", "gateway IP address", "gateway port number", and "connection means". The "connection definition name" is used to define types of line connection and location, which includes "connection 1" {e.g. portable telephone connection (Tokyo access point)}, "connection 2" {e.g. PHS connection (Tokyo access point)}, and "connection 3" (e.g. PHS connection (Osaka access point)).

"Connection-destination telephone number" denotes a telephone number of a connection destination (e.g. access point). "User name" denotes a user name allowed to connect a concerned line. The "password" is used to certify that a concerned user is the proper person. "Gateway IP address" denotes an IP address of a gateway computer used for line connection (data communication).

"Gateway port number" denotes a port number of a gateway computer used for line connection (data communication). "Connection means" is used to specify a connection unit used for line connection. In this case, the connection unit includes the portable telephone card 810, PHS card 820, modem 830, and LAN card 840 shown in FIG. 2. Actually, connection-means identification numbers for identifying the portable telephone card 810, PHS card 820, modem 830, and LAN card 840 are stored in the field of "connection means".

Figure 5:
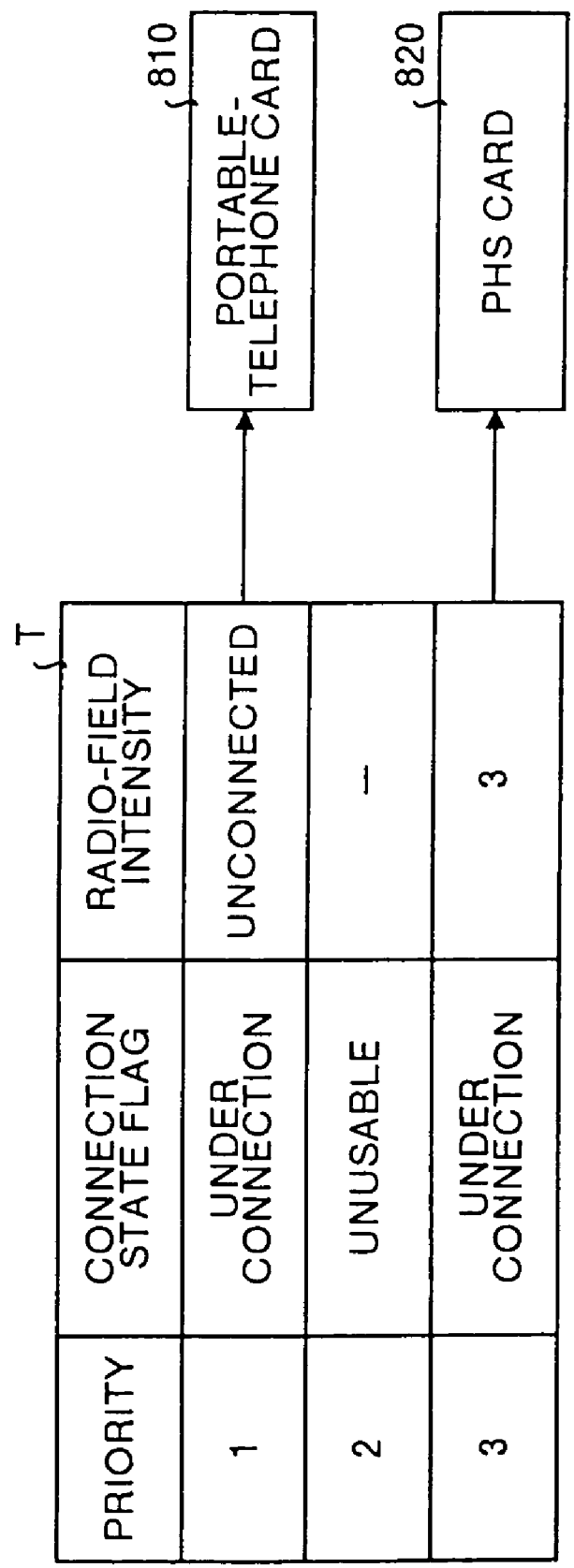
FIG. 5 is an illustration showing a connection control table T used for the embodiment in FIG. 1.

Automatic line selection program 114 shown in FIG. 4 is a program for automatically selecting an optimum line out of radio lines 200 (portable-telephone line and PHS line) according to received radio-field intensity. The connection control table T shown in FIG. 5 is set to the automatic line selection program 114. The connection control table T is constituted of such fields as "priority", "connection state flag", and "radio-field intensity" which are set every type of the radio line 200.

"Priority" denotes the information for deciding a connection unit preferentially used when there are a plurality of connection units respectively having a received radio-field intensity equal to or more than a certain value among connection units (portable-telephone card 810 and PHS card 820) connected to the information terminal unit 100 (PCMCIA slot 105). "Connection state flag" is a flag showing whether a concerned connection unit is connected to the information terminal unit 100 (PCMCIA slot 105). "Radio-field intensity" denotes a received radio-field intensity when a concerned connection unit is connected to the information terminal unit 100 (PCMCIA slot 105).

In the gateway computer 500 in FIG. 4, a gateway program 510 executes data communication with the client application program 110 (server computer 700). The socket 520 is an interface for using TCP similarly to the mobile socket 130, which realizes data communication by setting a call between the mobile socket 130 and a socket 720.

A TCP/IP control section 530 performs communication control in accordance with TCP/IP. A LAN control section 550 controls data communication when the LAN 400 is selected as a data communication line. Moreover, the LAN control section 550 controls the data communication using the LAN 600. A PPP control section 540 controls data communication in accordance with PPP when the radio line 200 or telephone line 300 is selected as a data communication line.

A connection-control-table copying program 511 copies the connection control table 112 in the information terminal unit 100 (refer to FIG. 6) and uses the copy as a connection control table 512. An information-terminal-unit identification information for identifying the information terminal unit 100 is added to the connection control table 512 and moreover, a received-data buffer for buffering received data is set to the table 512 instead of a transmitted-data buffer. The received-data buffer stores the data received by the gateway computer 500.

In the server computer 700, a server application program 710 executes data communication with the information terminal unit 100 via the gateway computer 500. The socket 720 serves as an interface for using TCP similarly to the mobile socket 130, which realizes data communication by setting a call between the socket 720 and the socket 520. A TCP/IP control section 730 performs communication control in accordance with TCP/IP. A LAN control section 740 controls data communication using the LAN 600.

Then, operations of the embodiment are described below. Actually, various programs (client application program 110 and the like) shown in FIG. 4 execute various processings by the CPU 101 (refer to FIG. 3). The following description assumes that these various programs execute various processings.

Figure 8:
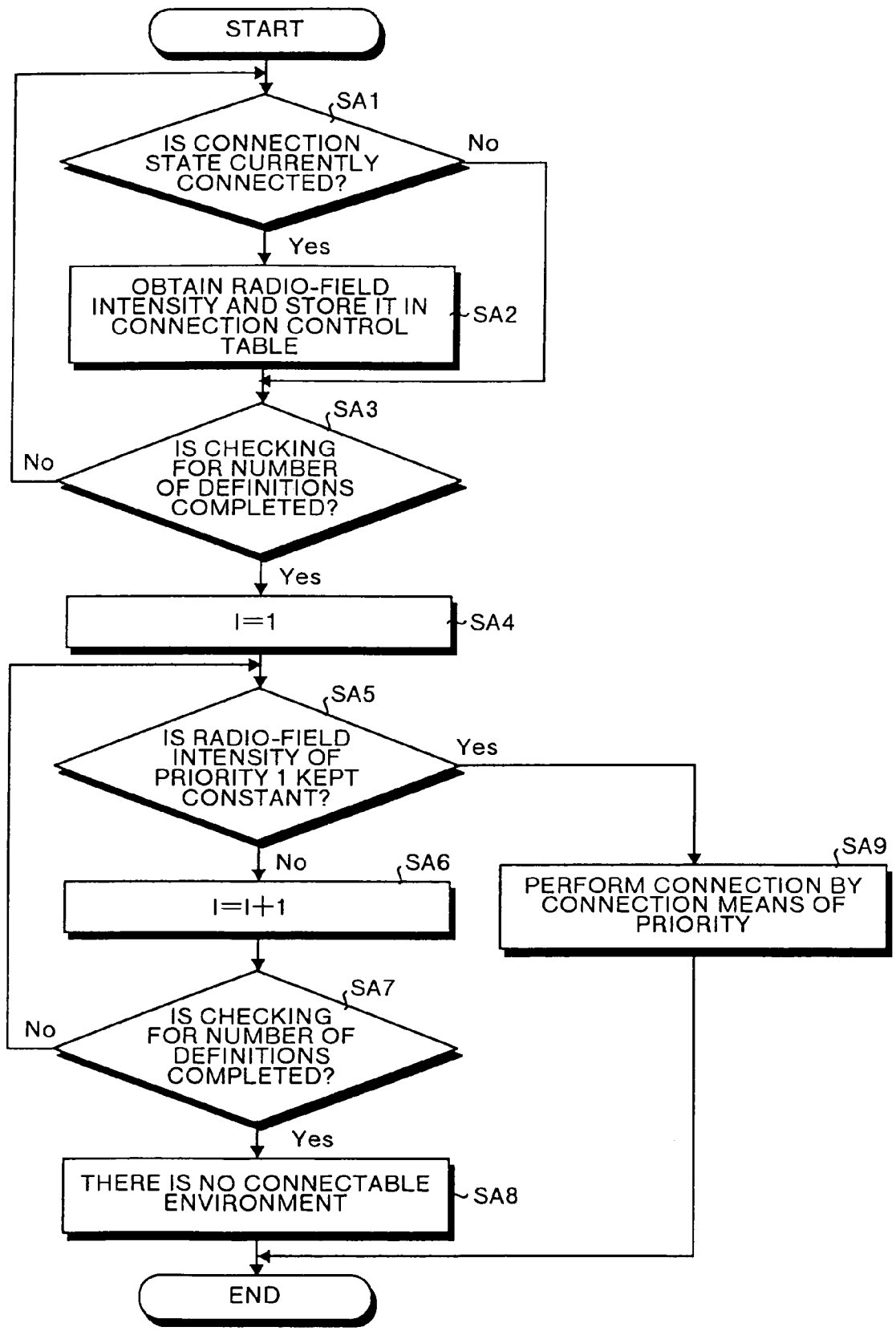
FIG. 8 is a flowchart for explaining the connective operation of the embodiment in FIG. 1.

First, the connective operation of the embodiment is described by referring to FIG. 8. In step SA1 shown in FIG. 8, the automatic line selection program 114 determines whether "connection-state flag" of the first record of the connection control table T shown in FIG. 5 indicates "under connection". In this case, when it is assumed that the portable-telephone card 810 is connected to the PCMCIA slot 105 and "connection state flag" indicates "under connection", the automatic line selection program 114 sets a determined result in step SA1 to "Yes".

In step SA2, the automatic line selection program 114 obtains a radio-field intensity at a portable-telephone terminal. In this case, when assuming that the portable-telephone terminal is not connected to the portable-telephone card 810, the radio-field intensity is equal to 0. Then, the automatic line selection program 114 stores the radio-field intensity in "radio-field intensity" of the connection control table T. In this case, "unusable" is stored in "radio-field intensity". In step SA3, the automatic line selection program 114 determines whether connection-state checking is repeated up to the number of definitions (in this case, three records shown in FIG. 5). In this case, the program 114 sets the determined result to "No".

In step SA1, the automatic line selection program 114 determines whether "connection state flag" of the second record of the connection control table T indicates "under connection" and sets the determined result in step SA1 to "No" because the connection unit having "priority" 2 is not connected to the PCMCIA slot 105. In step SA3, the automatic line selection program 114 determines whether connection-state checking is repeated up to the number of definitions. In this case, the program 114 sets the determined result to "No".

In step SA1, the automatic line selection program 114 determines whether "connection-state flag" of the third record of the connection control table T indicates "under connection". In this case, when it is assumed that the PHS card 820 is connected to the PCMCIA slot 105 and "connection state flag" indicates "under connection", the automatic line selection program 114 sets the determined result in step SA1 to "Yes".

In step SA2, the automatic line selection program 114 obtains a radio-field intensity (=3) at a PHS terminal connected to the PHS card 820 and stores the intensity in "radio-field intensity" of the connection control table T. The automatic line selection program 114 sets the determined result in step SA3 to "Yes" and substitutes 1 for priority I in step SA4. In step SA5, the automatic line selection program 114 determines whether the radio-field intensity of the priority 1 shown in FIG. 5 is kept at a certain value (e.g. 2) or more. In this case, the program 114 sets the determined result to "No".

In step SA6, the automatic line selection program 114 sets the priority I to 2 by incrementing the priority I by 1. In step SA7, the automatic line selection program 114 determines whether radio-field intensity checking is repeated up to the number of definitions. In this case, the program 114 sets the determined result to "No". In step SA5, the automatic line selection program 114 determines whether the radio-field intensity of the priority 2 shown in FIG. 5 is kept at a certain value (e.g. 2) or more. In this case, the program 114 sets the determined result to "No".

In step SA6, the automatic line selection program 114 sets the priority I to 3 by incrementing it by 1. In step SA7, the automatic line selection program 114 determines whether radio-field intensity checking is repeated up to the number of definitions. In this case, the program 114 sets the determined result to "No". Instep SA5, the automatic line selection program 114 determines whether the radio-field intensity of the priority 3 shown in FIG. 5 is a certain value (e.g. 2) or more. In this case, the program 114 sets the determined result to "Yes".

In step SA9, the automatic line selection program 114 communicates the connection means of the priority I, that is, connection by the PHS card 820 shown in FIG. 5 to the client application program 110. Thereby, the information terminal unit 100 is connected to the radio line 200 (in this case, PHS line). However, when the determined result in step SA7 is "Yes", the automatic line selection program 114 recognizes that there is no environment in which connection can be performed and therefore, it does not execute any processing for connection.

Figure 9:
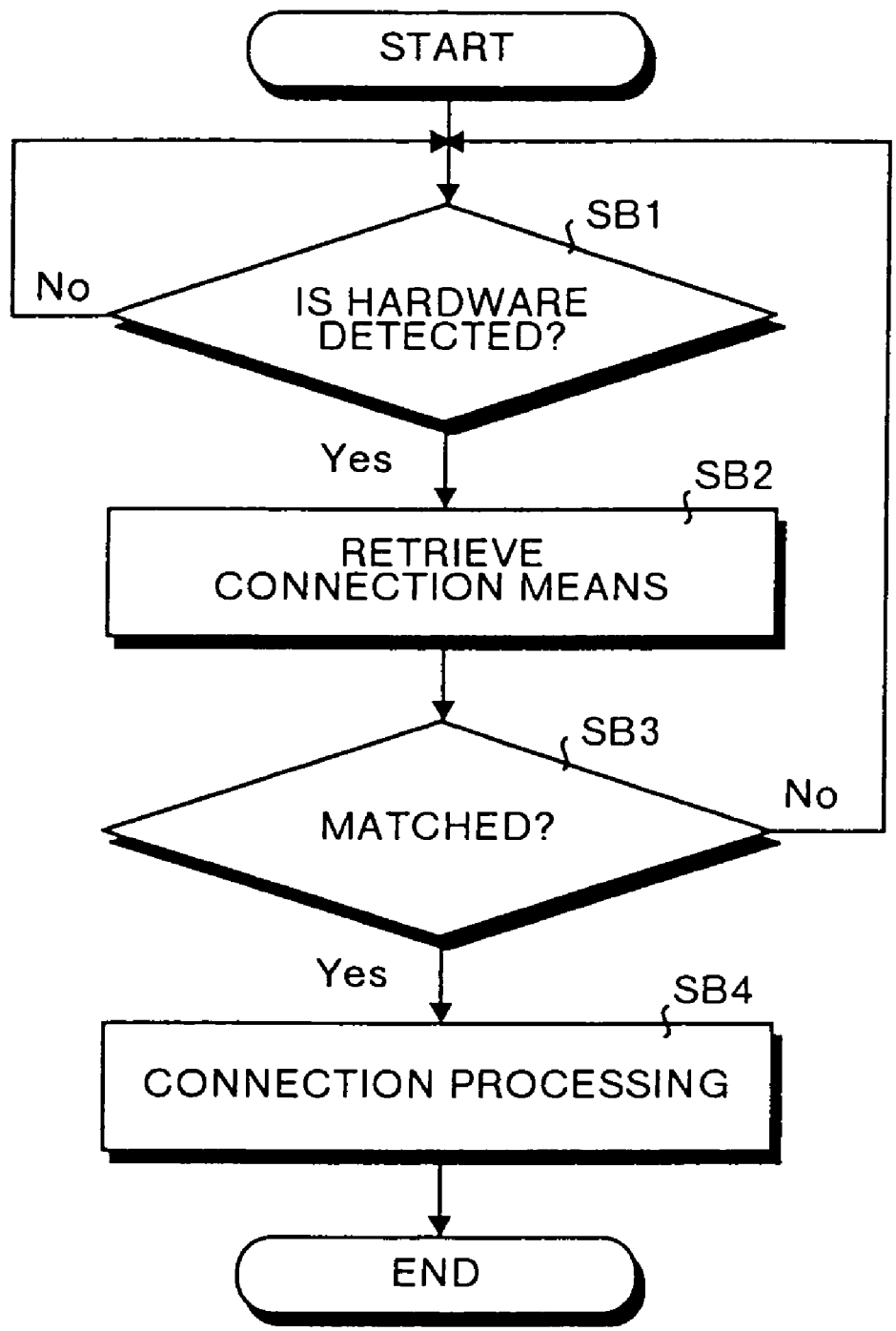
FIG. 9 is a flowchart for explaining automatic connective operation of the embodiment in FIG. 1.

Then, automatic connective operation of the embodiment is described below by referring to the flowchart shown in FIG. 9. The above automatic connective operation represents that a connection unit (portable-telephone card 810, PHS card 820, modem 830, or LAN card 840) is detected as hardware and automatically connected to a line. In step SB1 shown in FIG. 9, the interrupt/restart program 111 determines whether hardware (connection unit) is detected. In this case, the determined result is assumed as "No" and the determination is repeated.

Then, when the portable-telephone card 810 shown in FIG. 2 is connected to the PCMCIA slot 105 (refer to FIG. 3), the interrupt/restart program 111 sets the determined result in step SB1 to "Yes". In step SB2, the interrupt/restart program 111 retrieves connection means out of the connection information table 113 shown in FIG. 7 by using a number provided for the portable-telephone card 810 as a key. In step SB3, the program 111 determines whether the number for the portable-telephone card 810 coincides with "connection means" of the connection information table 113. In this case, it is assumed that the determined result is "Yes". When the determined result in step SB3 is "No", the interrupt/restart program 111 executes the processing in step SB1.

In this case, in step SB4, the connection information table 113 notifies the client application program 110 to use the portable-telephone card 810 as connection means. Thereby, the information terminal unit 100 is connected to the radio line 200 (in this case, portable-telephone line).

Then, actual connection, reconnection, and interruption are described by referring to FIG. 11 to FIG. 19. First, operations relating to a SOCKET command for realizing a socket of the embodiment are described by referring to FIG. 10 and FIG. 11. For connection, in step SC1 shown in FIG. 10, the client application program 110 shown in FIG. 11 requests the TCP/IP control section 140 to execute the SOCKET command (protocol PA1 and protocol PA2). Thereby, in the case of the protocol PA3 shown in FIG. 11, the TCP/IP control section 140 communicates a real connection identification number to the mobile socket 130.

Figure 10:
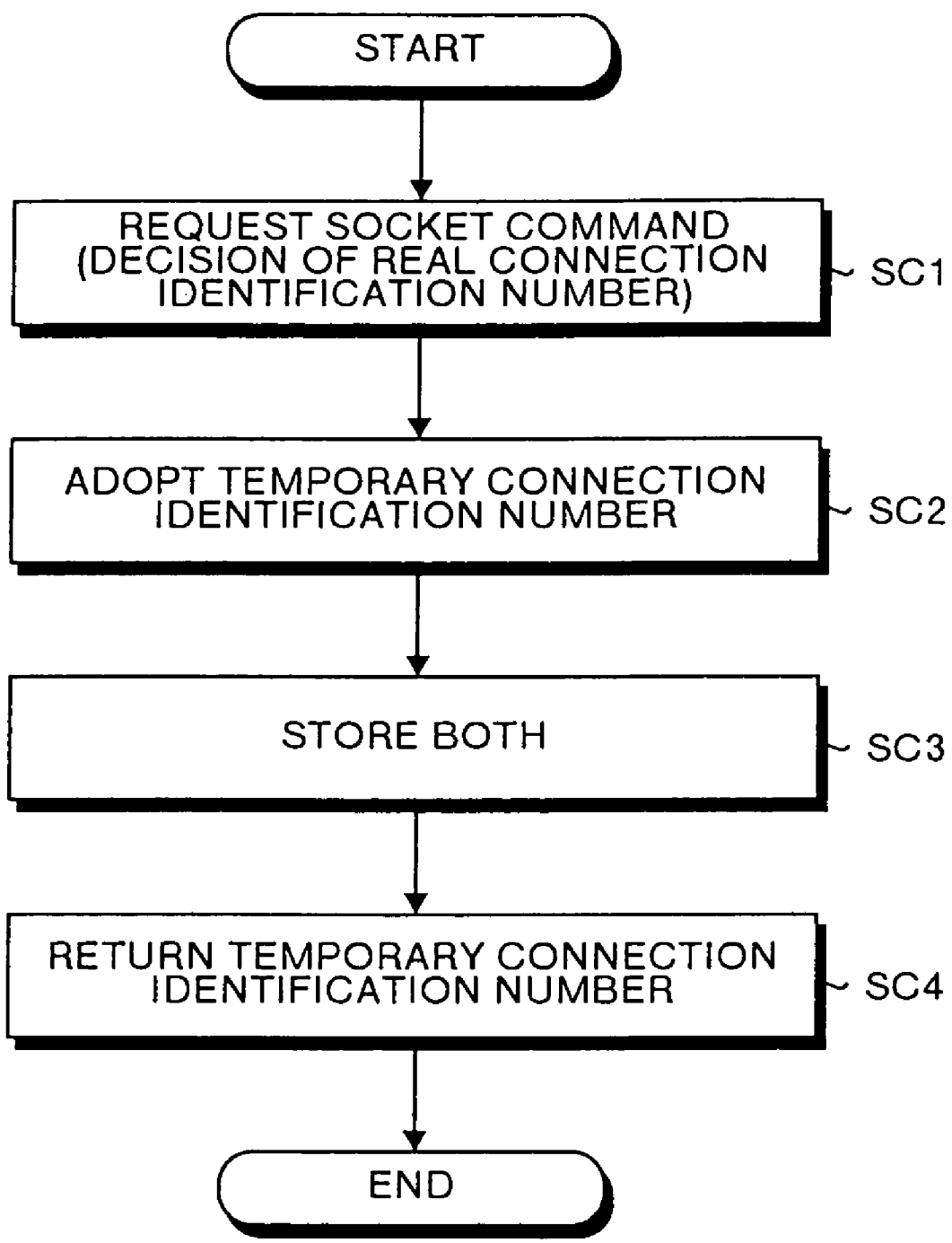
FIG. 10 is a flowchart for explaining operations of the embodiment in FIG. 1 when a SOCKET command is issued.
Figure 11:
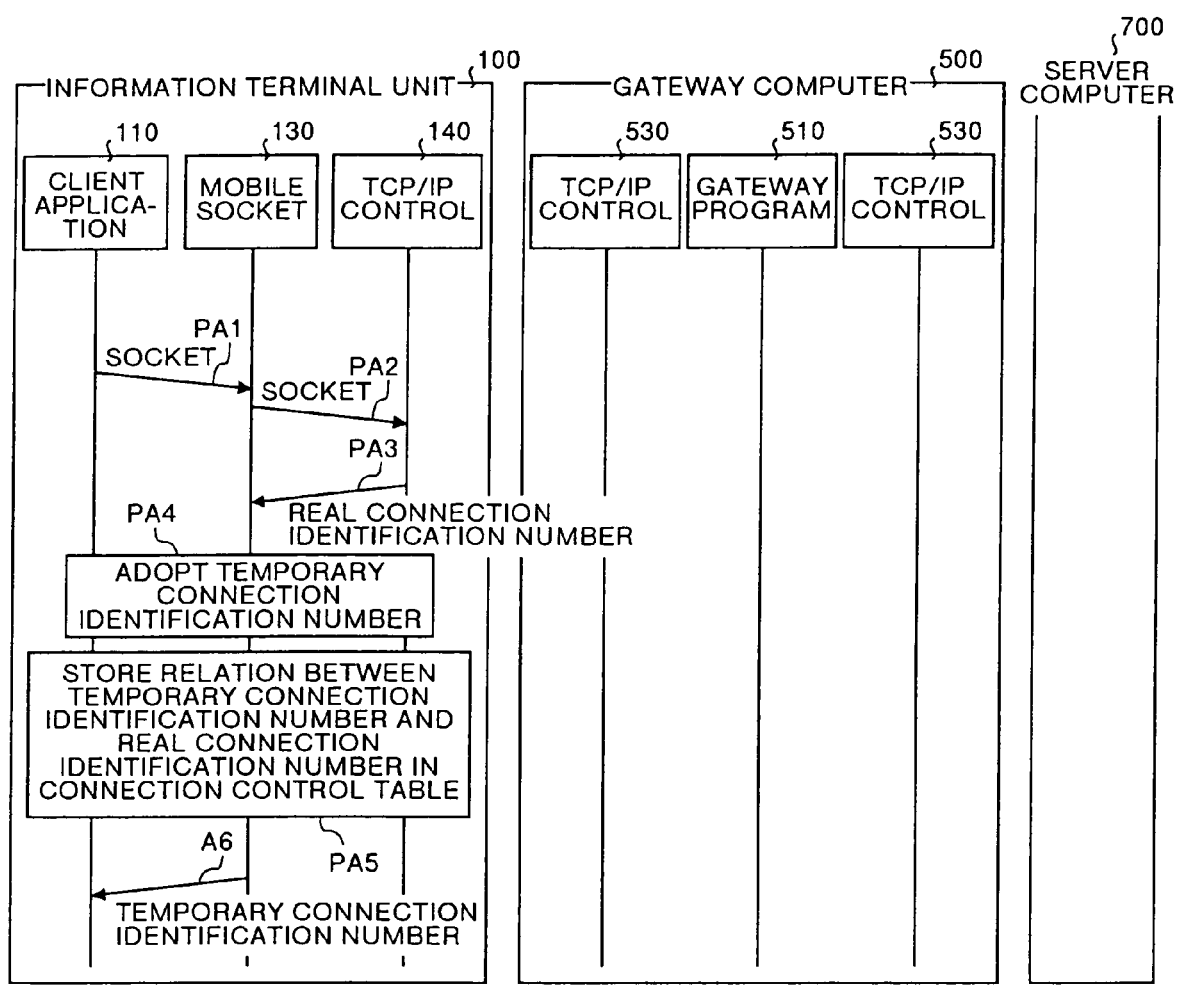
FIG. 11 is an illustration showing a protocol sequence of the embodiment in FIG. 1 when a SOCKET command is executed.

In step SC2 shown in FIG. 10, the mobile socket 130 uses a real connection identification number (protocol PA4; refer to FIG. 11). In step SC3, the mobile socket 130 stores a temporary connection identification number and a real connection identification number in the connection control table T (refer to FIG. 6). In step SC5, the mobile socket 130 returns the temporary connection identification number to the client application program 110 (protocol PA6; refer to FIG. 11).

Figure 12:
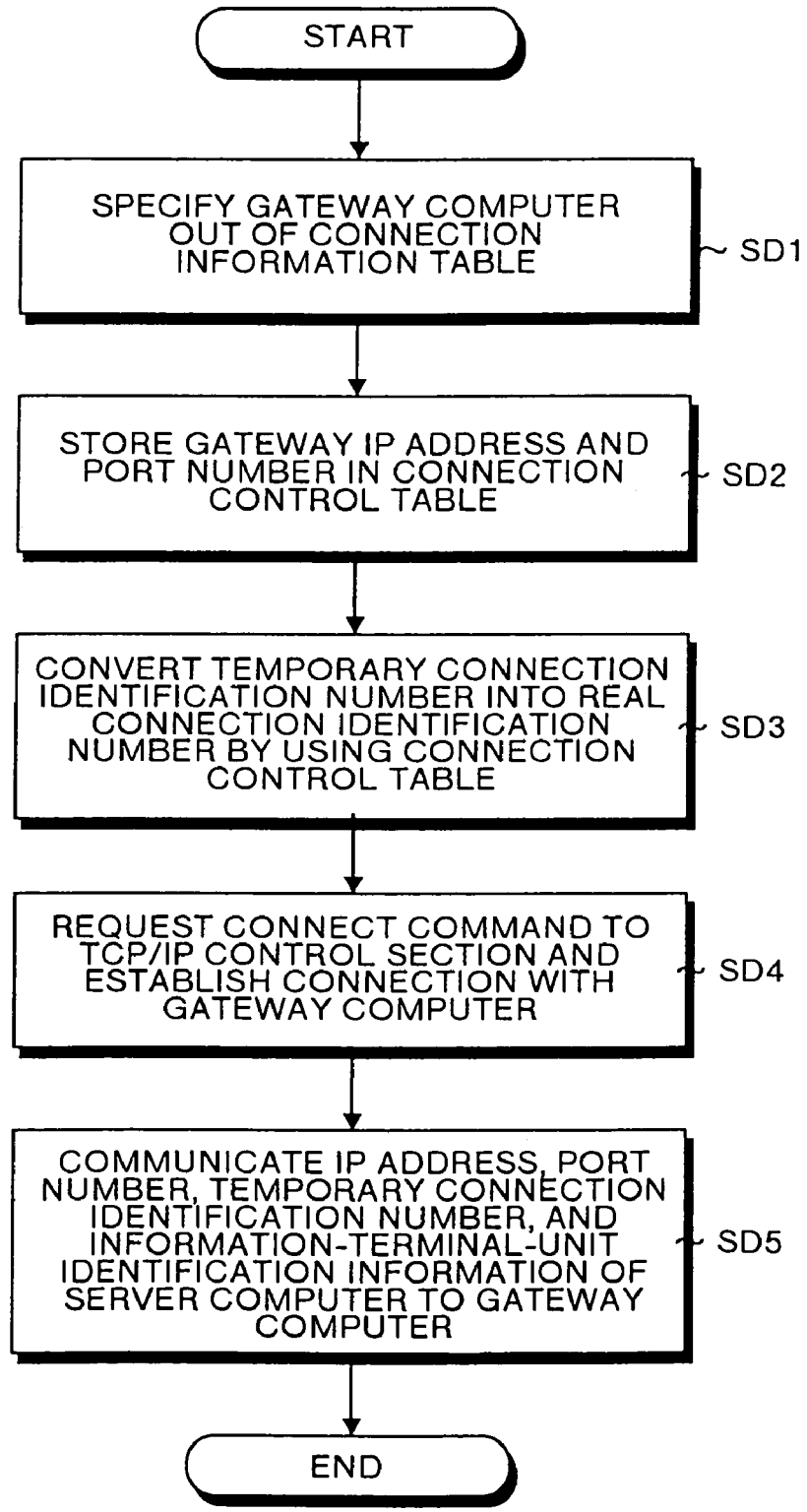
FIG. 12 is a flowchart for explaining operations of the embodiment in FIG. 1 when a CONNECT command is executed.
Figure 13:
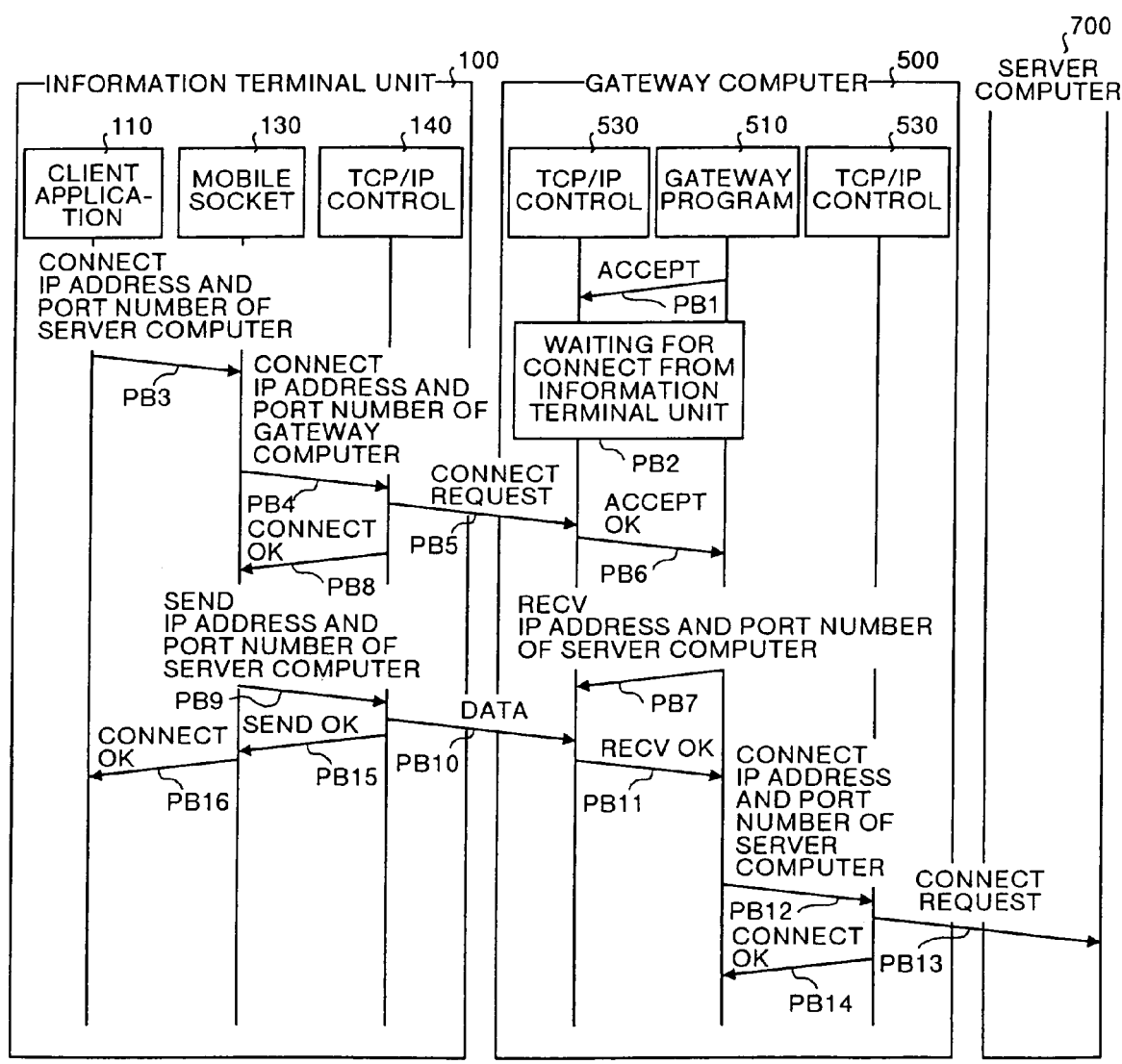
FIG. 13 is an illustration showing a protocol sequence of the embodiment in FIG. 1 when a CONNECT command is executed.

Then, to execute a CONNECT command for establishing connection, the client application program 110 recognizes "gateway IP address" and "gateway port number" corresponding to connection means (in this case, PHS1) used for line connection in the connection control table 113 shown in FIG. 7 and then specifies the connection-destination gateway computer 500 in accordance with the address and the number in step SD1 shown in FIG. 12. In step SD2, the client application program 110 stores the above "gateway IP address" and "gateway port number" in the connection control table 112 shown in FIG. 6.

In step SD3, the client application program 110 converts a temporary connection identification number into a real connection identification number by using the connection control table 112. Instep SD4, the client application program 110 requests the TCP/IP control section 140 to execute a CONNECT command. Thereby, the CONNECT command is executed and connection is established between the TCP/IP control section 140 of the information terminal unit 100 and the gateway computer 500 (TCP/IP control section 530).

In step SD5, the mobile socket 130 communicates the IP address, port number, temporary connection identification number, and information-terminal-unit identification number for the server computer 700 to the gateway computer 500. Moreover, the mobile socket 130 sets "line state" of the connection control table 112 to connection. Actually, when a series of CONNECT commands are executed, various processings are executed in accordance with protocols PB1 to PB14 shown in FIG. 13.

Figure 14:
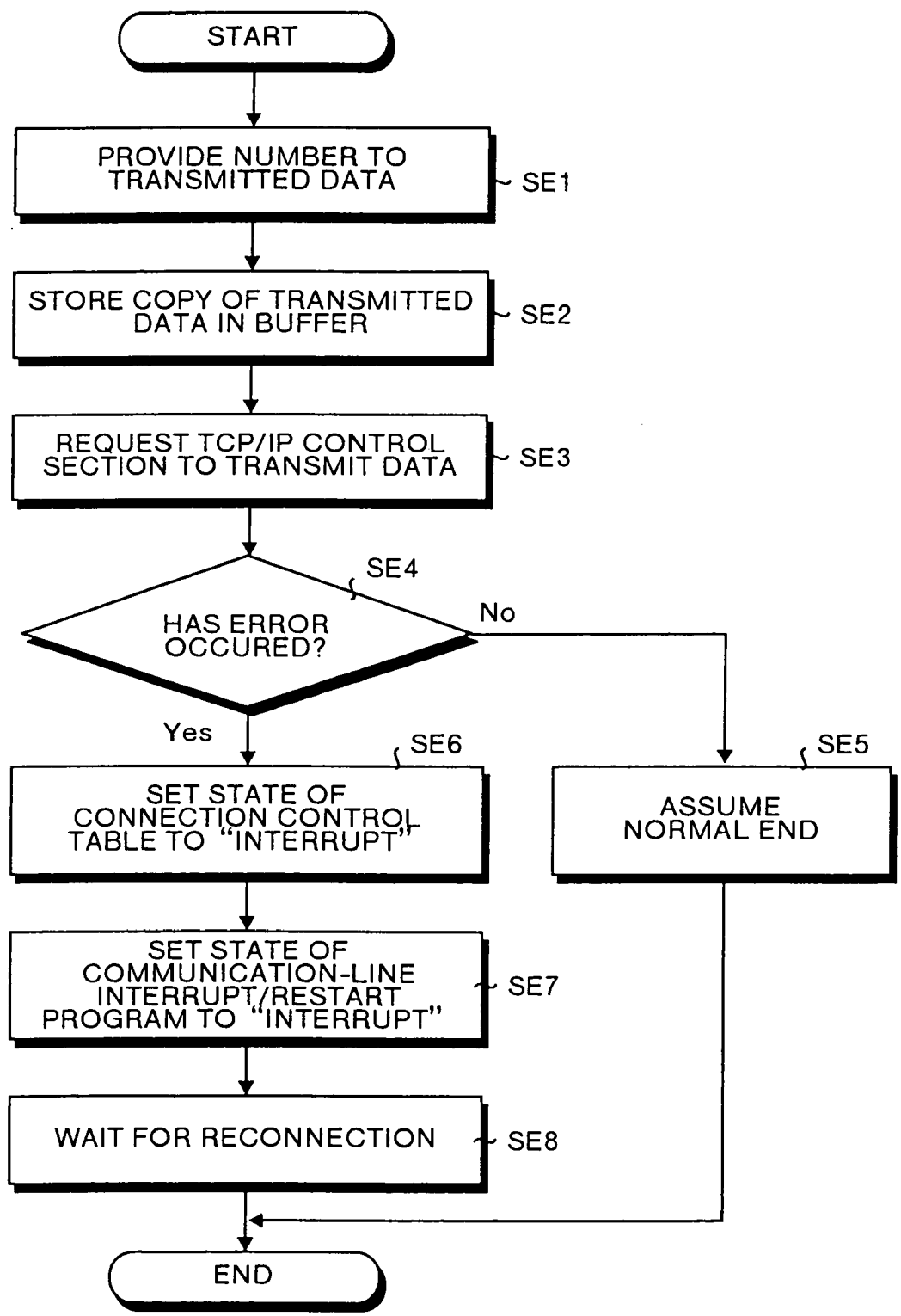
FIG. 14 is a flowchart for explaining operations of the embodiment in FIG. 1 when a SEND command is executed.
Figure 16:
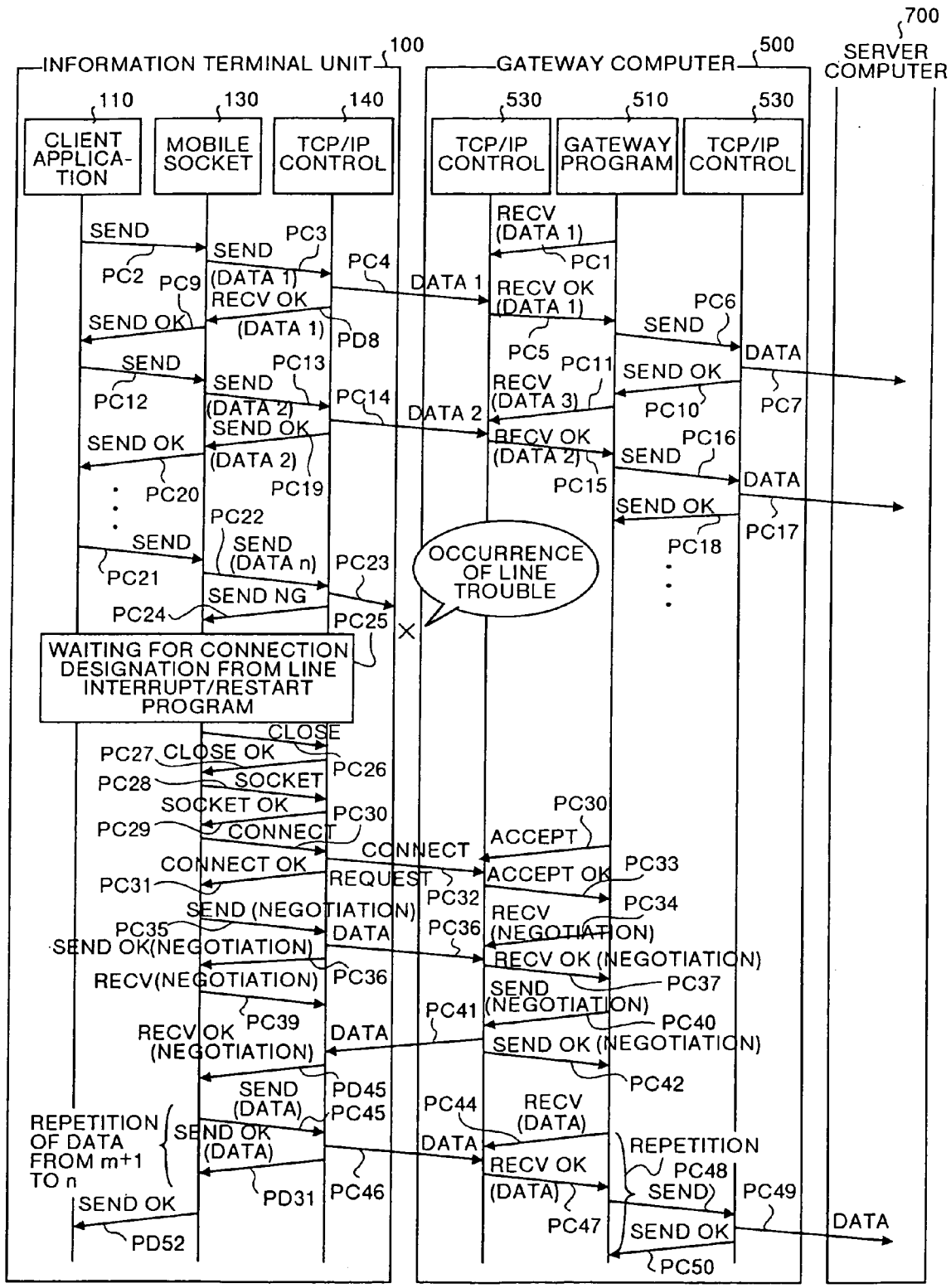
FIG. 16 is an illustration showing a protocol sequence of the embodiment in FIG. 1 when a SEND command and reconnection are executed.

Operations relating to a SEND command for transmitting data are described below by referring to FIG. 14 and FIG. 16. After connection is established, in step SE1 shown in FIG. 14, the client application program 110 adds a number to the transmitted data to be transmitted to the server computer 700.

In step SE2, the client application program 110 stores a copy of the transmitted data in a transmitted-data buffer (not illustrated) and links the buffer with the connection control table 112 (refer to FIG. 6). In step SE3, the client application program 110 (mobile socket 130) executes a SEND command for the TCP/IP control section 140 to request the section 140 to execute data transmission. Thereby, the TCP/IP control section 140 transmits transmission data through the radio line 200 (PHS line).

In step SE4, the TCP/IP control section 140 determines whether there is an error such as disconnection due to deterioration of a received radio-field intensity or interrupt is designated by the interrupt/restart program 111. When the determined result is "No", transmitted data is normally received by the server computer 700 via the radio line 200, gateway computer 500, and LAN 600 in step SE5 and normally ended.

When data transmission is interrupted because an error occurs, the TCP/IP control section 140 sets the determined result in step SE4 to "Yes". In step SE6, the TCP/IP control section 140 notifies the mobile socket 130 that a transmission error occurs. Thereby, the mobile socket 130 sets the line state of the connection control table 112 (refer to FIG. 6) to "interrupt". In this case, the mobile socket 130 and gateway program 510 (socket 520) recognize that the transmission error occurs. In step SE6, the client application program 110 sets the state of its own to "interrupt".

However, occurrence of the transmission error is not communicated to the client application program 110 or server application program 710 of the server computer 700. Therefore, neither client application program 110 nor server application program 710 recognize the transmission error. In step SE8, the mobile socket 130 waits until reconnection is designated by the interrupt/restart program 111. Actually, various processings are executed in accordance with protocols PC1 to PC25 when a series of SEND commands are executed.

Figure 15:
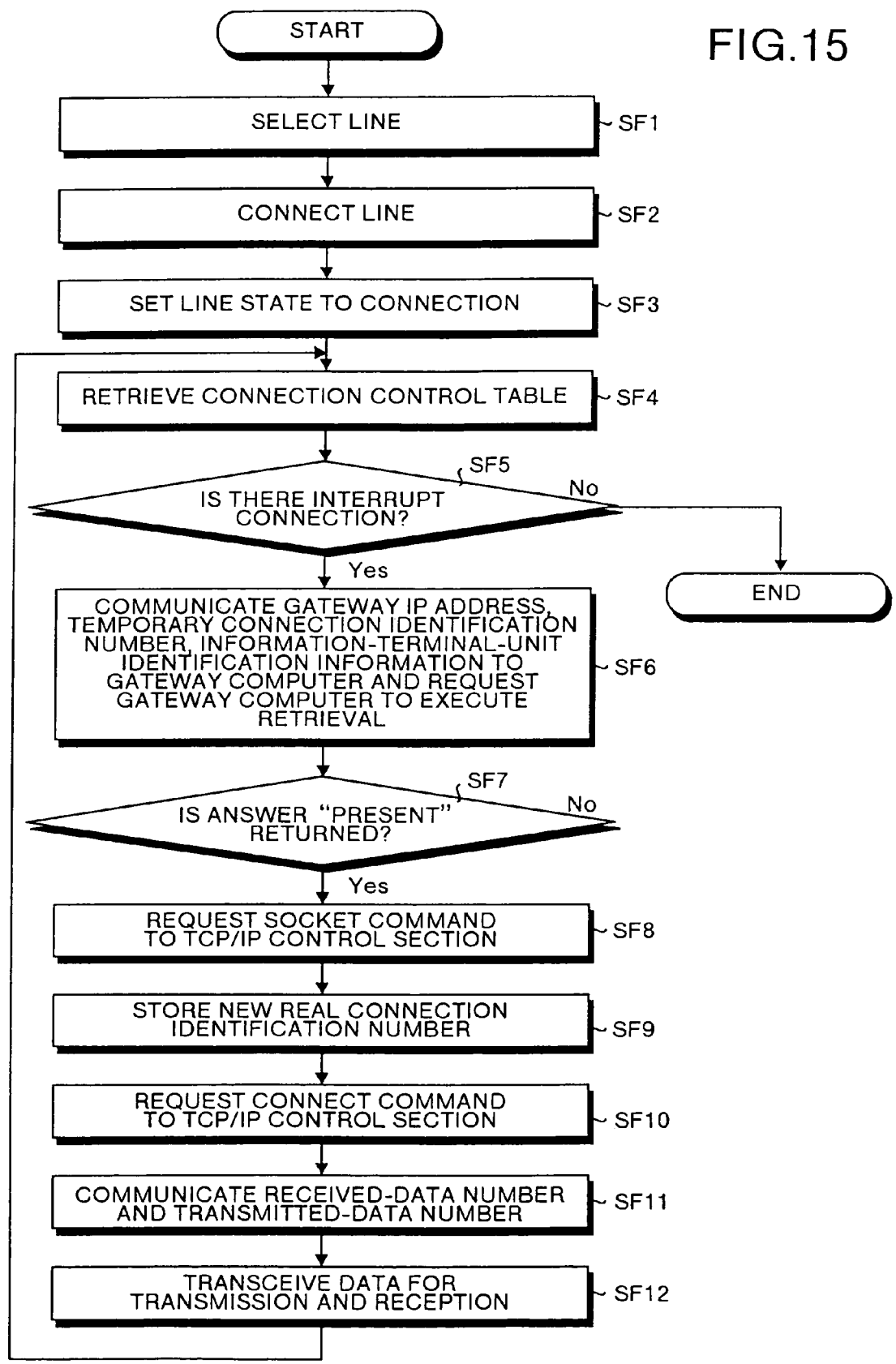
FIG. 15 is a flowchart for explaining the re-connective operation of the embodiment in FIG. 1.

In this case, when reconnection is designated, the mobile socket 130 performs the same operation as the connective operation shown in FIG. 8 and then selects a connectable line in step SF1 shown in FIG. 15. That is, in this case, a line having a received radio-field intensity equal to or higher than a certain value is selected. In step SF2, the mobile socket 130 connects the selected line. In step SF3, the mobile socket 130 sets a connection-state flag corresponding to a concerned line in the connection control table T to "under connection".

In step SF4, the mobile socket 130 retrieves the connection control table 112 shown in FIG. 6 by using "line state" as a key. In step SF5, the mobile socket 130 determines whether there is a line state (connection state) which is disconnected. When the determined result is "No", the mobile socket 130 ends a series of operations. However, when the determined result is "Yes" in step SF5, the mobile socket 130 communicates gateway IP address, temporary connection identification number, and information-terminal-unit identification information to the gateway computer 500 in which data is interrupted and requests the computer 500 to retrieve contents of the connection control table 512 in step SF6.

Thereby, the gateway program 510 (socket 520) determines whether a record for which data should be retransmitted (or re-received) is present in the connection control table 512 by using the information communicated from the mobile socket 130 as a key. When the determined result is "Yes", the program 510 returns an answer "present" to the mobile socket 130. However, when the determined result is "No", the gateway program 510 returns an answer "absent" to the mobile socket 130.

In step SF7, the mobile socket 130 determines whether the answer from the gateway program 510 is "present". When the determined result is "No", the mobile socket 130 executes the processing in step SF4. In this case, when it is assumed that the determined result in step SF7 is "Yes", data retransmission (or data re-reception) is executed from step SF8 downward. That is, in step SF8, the mobile socket 130 requests the TCP/IP control section 140 to execute a SOCKET command. Thereby, in step SF9, the TCP/IP control section 140 communicates a new real connection identification number to the mobile socket 130 and the mobile socket 130 stores the new real connection identification number in the connection control table 112.

In step SF10, the mobile socket 130 requests the TCP/IP control section 140 to execute the above-described CONNECT command. Thereby, the CONNECT command is executed and connection is established between the TCP/IP control section 140 of the information terminal unit 100 and the gateway computer 500 (TCP/IP control section 530).

In step SF11, the mobile socket 130 communicates a transmitted-data number stored in "transmitted-data buffer" of the connection control table 112 to the gateway program 510 (socket 520) and the gateway program 510 (socket 520) communicates a received-data number stored in "received-data buffer" of the connection control table 512 to the mobile socket 130. In step SF12, data transfer is resumed starting with data next to the data received by other party due to interrupt between the mobile socket 130 and gateway program 510. (socket 520). Actually, various processes are executed in accordance with protocols PC26 to PC52 shown in FIG. 16 at a series of reconnections.

Figure 17:
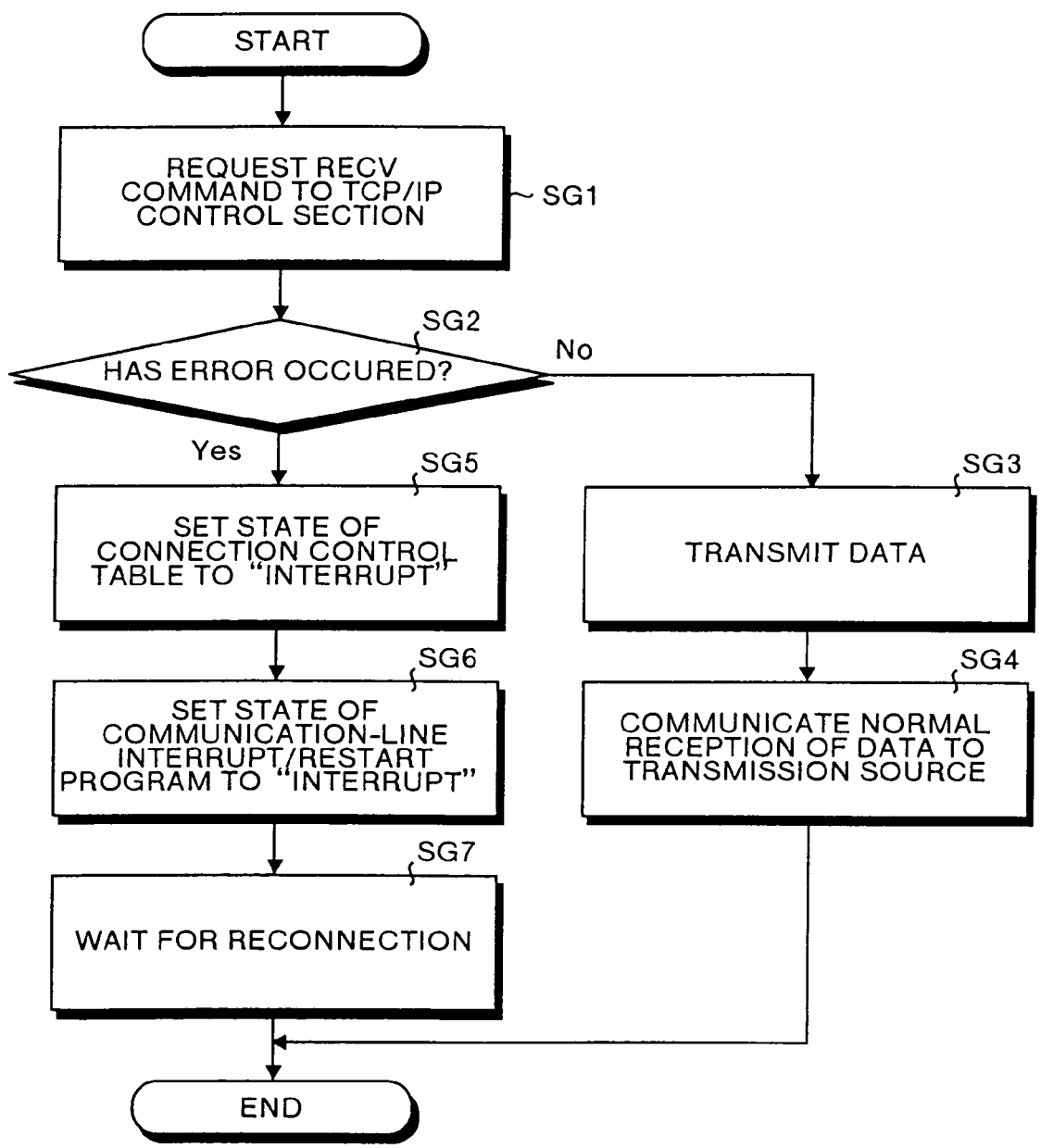
FIG. 17 is a flowchart for explaining operations of the embodiment in FIG. 1 when a RECV command is executed.
Figure 18:
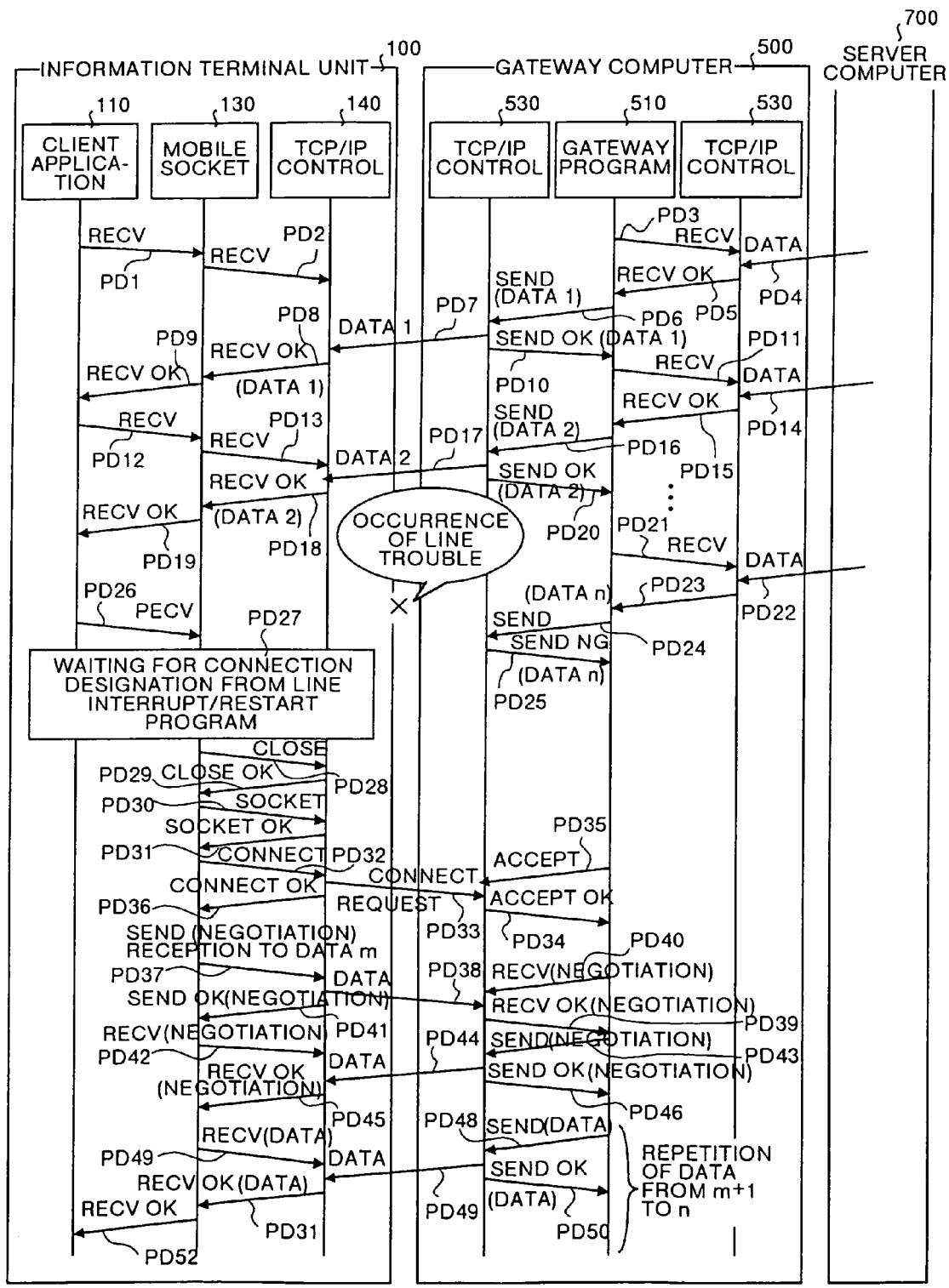
FIG. 18 is an illustration showing a protocol sequence of the embodiment in FIG. 1 when a RECV command and reconnection are executed.

Operations relating to a RECV command for receiving data are described below by referring to FIG. 17 and FIG. 18. After connection is established, the client application program 110 (mobile socket 130) requests the TCP/IP control section 140 to execute a RECV command in step SG1 shown in FIG. 17. Thereby, the TCP/IP control section 140 executes reception of data from the server computer 700 through the radio line 200 (PHS line).

IN step SG2, the TCP/IP control section 140 determines whether there is an error such as disconnection due to deterioration of a received radio-field intensity or interrupt is designated by the interrupt/restart program 111. When the determined result is "No", the TCP/IP control section 140 transmits received data to a buffer designated by the client application program 110 in step SG3. In step SG4, normal reception is communicated to the (transmission source) gateway program 510.

However, when data reception is interrupted because an error occurs, the TCP/IP control section 140 sets the determined result instep SG2 to "Yes". Instep SG5, the TCP/IP control section 140 notifies the mobile socket 130 that a reception error occurs. Thereby, the mobile socket 130 sets a line state in the connection control table 112 (refer to FIG. 6) to "interrupt". In this case, the mobile socket 130 and gateway program 510 (socket 520) recognize that the reception error occurs. In step SG6, the interrupt/restart program 111 sets the state of its own to "interrupt".

However, occurrence of the reception error is not communicated to the client application program 110 or server application program 710 of the server computer 700. Therefore, neither client application program 110 nor server application program 710 recognize the reception error. In step SG7, the mobile socket 130 waits until reconnection is designated by the interrupt/restart program 111. Actually, when a series of RECV commands are executed, various processes are executed in accordance with protocols PD1 to PD27 shown in FIG. 18.

In this case, when reconnection is designated, the mobile socket 130 performs the same operation as the connective operation shown in FIG. 8 and then selects a connectable line in step SF1 shown in FIG. 15. In step SF2, mobile socket 130 connects the selected line. In step SF3, the mobile socket 130 sets a connection-state flag corresponding to a concerned line in the connection control table T to "under connection".

In step SF4, the mobile socket 130 retrieves the connection control table 112 shown in FIG. 6 by using "line state" as a key. In step SF5, the mobile socket 130 determines whether there is any interrupted line state (connection state). When the determined result is "No", the socket 130 ends a series of operations. However, when the determined result in step SF5 is "Yes", the mobile socket 130 communicates gateway IP address, temporary connection identification number, and information-terminal-unit identification information to the gateway computer 500 in which data is interrupted and requests the computer 500 to retrieve contents of the connection control table 512.

Thereby, the gateway program 510 (socket 520) determines whether a record for which data should be re-received is present in the connection control table 512 by using the information communicated from the mobile socket 130 as a key. When the determined result is "Yes", the gateway program 510 returns an answer "present" to the mobile socket 130. However, when the determined result is "No", the gateway program 510 returns an answer "absent" to the mobile socket 130.

In step SF7, the mobile socket 130 determines whether the answer from the gateway program 510 is "present". When the determined result is "No", the mobile socket 130 executes the processing in step SF4. In this case, when it is assumed that the determined result in step SF7 is "Yes", re-reception is executed from step SF8 downward. That is, in step SF8, the mobile socket 130 requests the TCP/IP control section 140 to execute a SOCKET command. Thereby, in step SF9, the TCP/IP control section 140 communicates a new real connection identification number to the mobile socket 130 and the mobile socket 130 stores the new real connection identification number in the connection control table 112.

In step SF10, the mobile socket 130 request the TCP/IP control section 140 to execute the above CONNECT command. Thereby, the CONNECT command is executed and connection is established between the TCP/IP control section 140 of the information terminal unit 100 and the gateway computer 500 (TCP/IP control section 530).

In step SF11, the mobile socket 130 communicates the number for the received data stored in "received-data buffer" of the connection control table 112 (in this case, "transmitted-data buffer" shown in FIG. 15 is reread as "received-data buffer") to the gateway program 510 (socket 520) and the gateway program 510 (socket 520) communicates the number for the received data stored in "received-data buffer" of the connection control table 512 to the mobile socket 130. In step SF12, data reception is resumed starting with data next to the data received by other party due to interrupt between the mobile socket 130 and gateway program 510 (socket 520). Actually, various processings are executed in accordance with protocols PD28 to PD52 shown in FIG. 18 for a series of reconnections.

Figure 19:
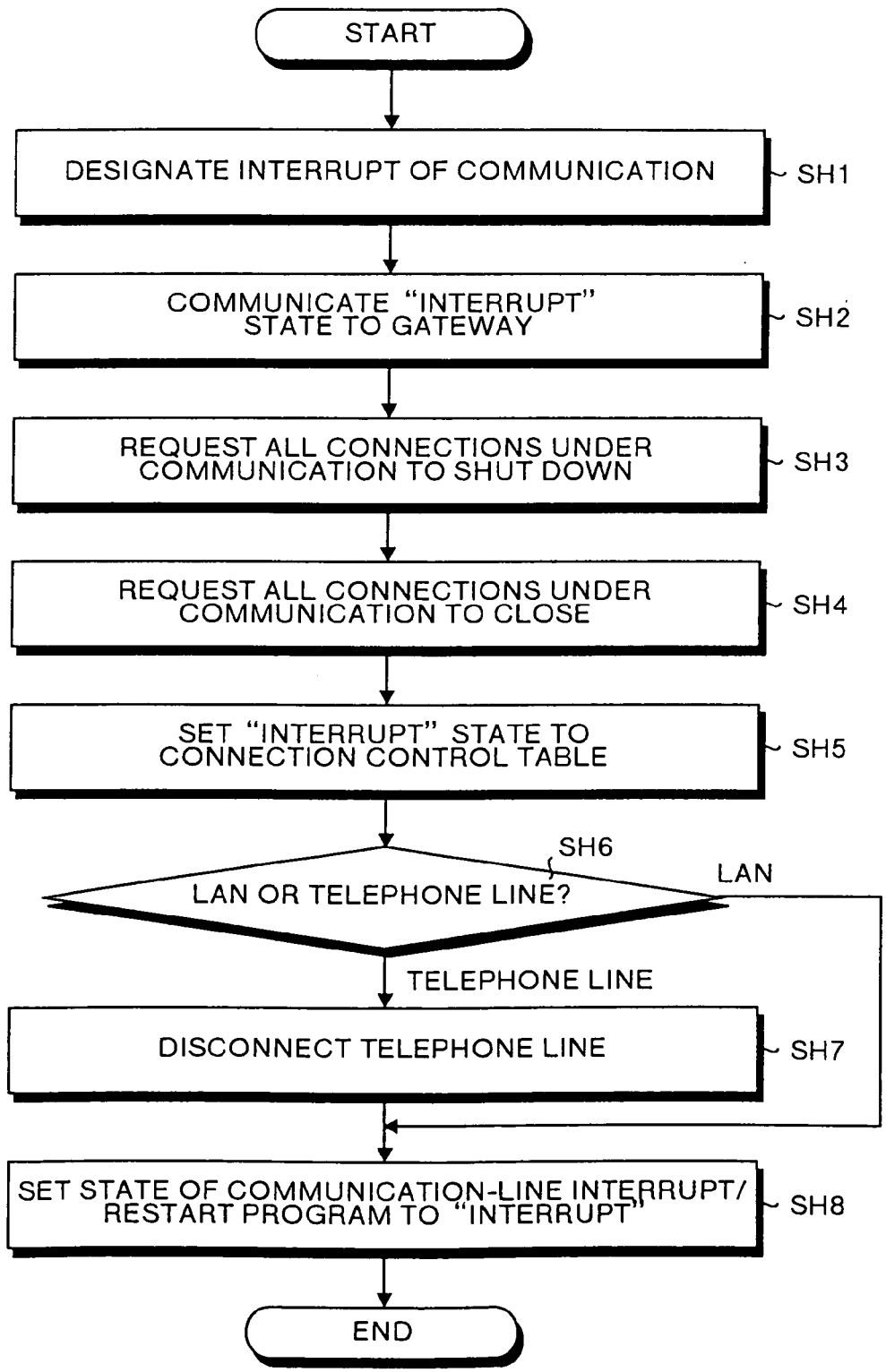
FIG. 19 is a flowchart for explaining the interrupt operation of the embodiment in FIG. 1.

Moreover, when interrupt of data communication is designated to the interrupt/restart program 111 through operations by a user in step SH1 shown in FIG. 19, the interrupt/restart program 111 communicates the interrupt state to the gateway computer 500 in step SH2. In step SH3, the interrupt/restart program 111 requests the TCP/IP control section 140 to shut down all connections under communication by using the socket interface 120 and mobile socket 130. Thereby, all connections are shut down.

In step SH4, the interrupt/restart program 111 requests the TCP/IP control section 140 to close all connection under communication by using the socket interface 120 and mobile socket 130. Thereby, all connections are closed. In step SH5, the interrupt/restart program 111 sets the line state (connection state) of the connection control table 112 to "interrupt".

In step SH6, the interrupt/restart program 111 determines whether a connected line is the LAN 400 or a telephone line (radio line 200 or telephone line 300). When the connected line is the LAN 400, the program 111 executes the processing in step SH8. However, when the connected line is a telephone line, the interrupt/restart program 111 disconnects the telephone line (radio line 200 or telephone line 300) in step SH7 and stores a copy of transmission data and a number for received data in a buffer. In step SH8, the interrupt/restart program 111 sets the state of its own to "interrupt". Thereby, the information terminal unit 100 is set to a reconnection standby state. When reconnection is executed, reconnection (refer to FIG. 15) is executed.

Figure 20:
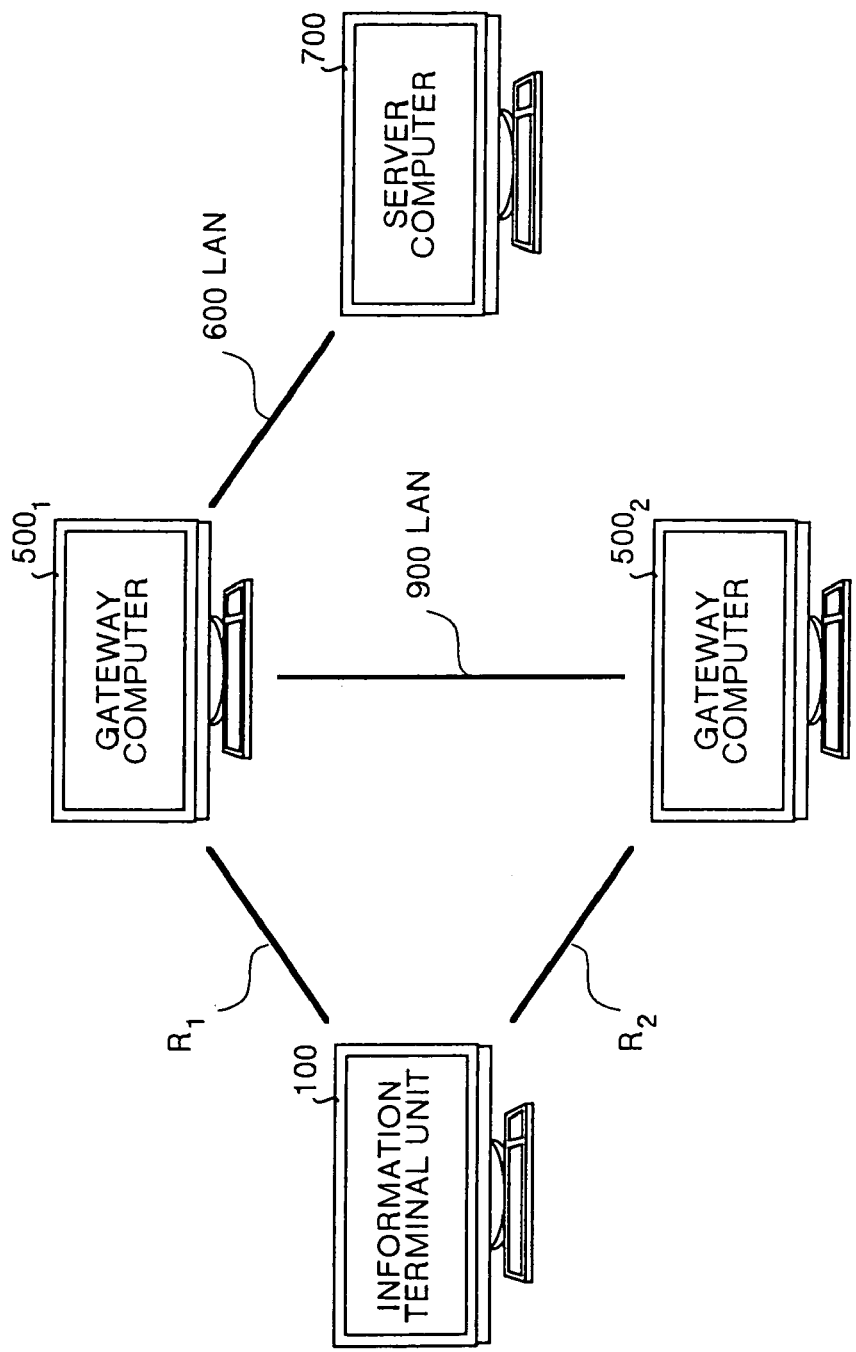
FIG. 20 is a block diagram showing a configuration of a modification of the embodiment in FIG. 1.

FIG. 20 is a block diagram showing a configuration of a modification of the embodiment of the present invention. In FIG. 20, a portion corresponding to that in FIG. 1 is provided with the same symbol. In FIG. 20, two gateway computers $500_1$ and $500_2$ are used for load dispersion. These gateway computers $500_1$ and $500_2$ are connected each other by a LAN 900 and have the same configuration as the gateway computer 500.

Moreover, a table having the same configuration as the connection control table 512 (refer to FIG. 4) is stored in the gateway computers $500_1$, and $500_2$ respectively. The gateway computer $500_1$ is connected to the server computer 700 by the LAN 600. For example, the information terminal unit 100 and the gateway computer $500_1$ can be connected each other by a PHS line $R_1$ while the information terminal unit 100 and the gateway computer $500_2$ can be connected each other by a portable-telephone line $R_2$.

Figure 21:
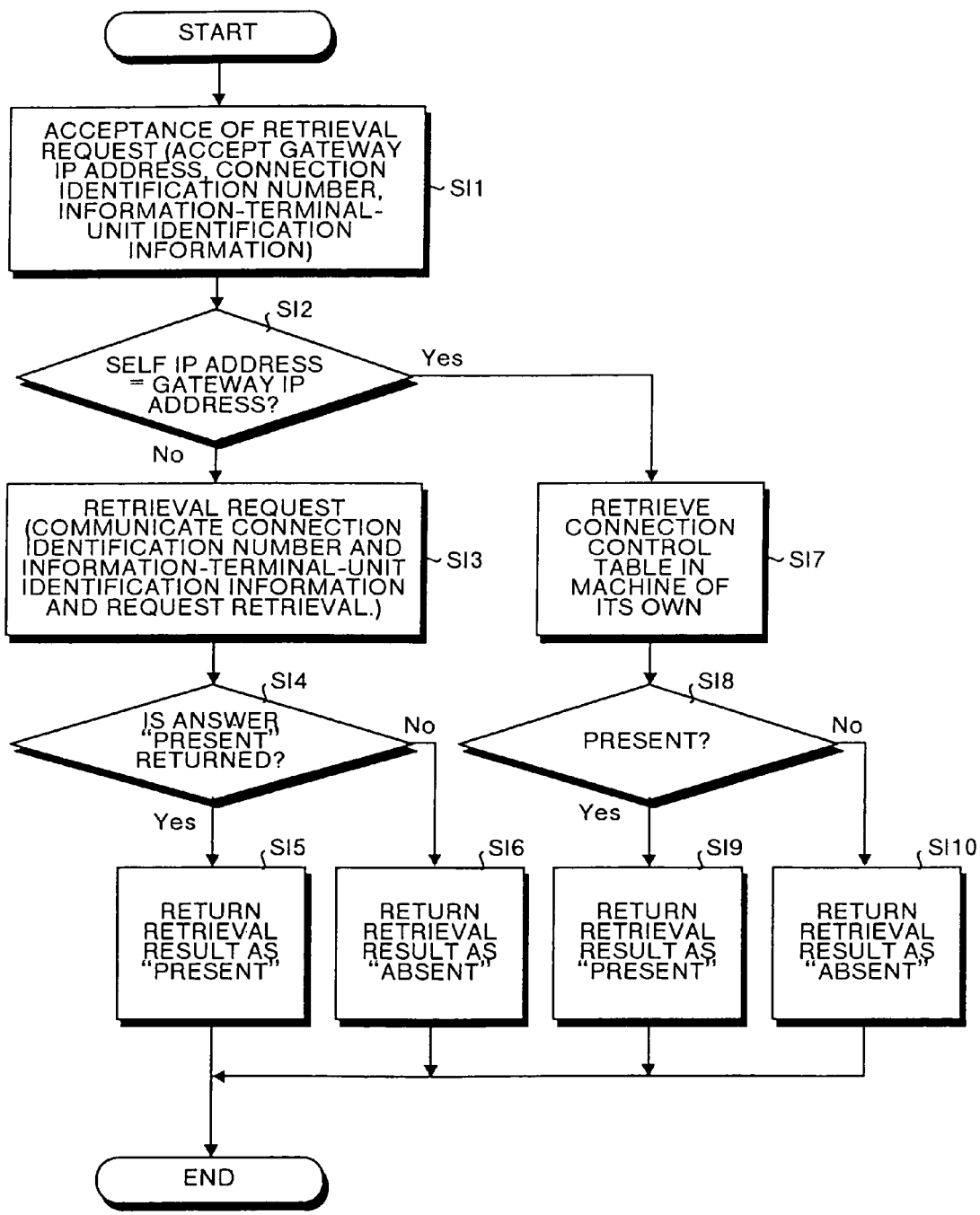
FIG. 21 is a flowchart for explaining operations of a modification of the embodiment in FIG. 1.

In this case, it is assumed that the above reconnection standby state is kept due to line disconnection under data communication using the information terminal unit 100, PHS line $R_1$, and gateway computer $500_1$. Under the above state, when the information terminal unit 100 is connected with the gateway computer $500_2$ by the portable-telephone line $R_2$ instead of the PHS line $R_1$, the gateway computer $500_2$ receives a gateway IP address, connection identification number, and information-terminal-unit identification number and accepts a retrieval request in step SI1 shown in FIG. 21.

In step SI2, the gateway computer $500_2$ determines whether a gateway IP address supplied from the information terminal unit 100 is the gateway IP address of its own. In this case, the computer $500_2$ sets the determined result to "No". That is, the information terminal unit 100 is connected to the gateway computer $500_1$ before waiting reconnection. In step SI3, the gateway computer $500_2$ communicates a connection identification number and information-terminal-unit identification information to the gateway computer $500_1$ corresponding to the gateway IP address communicated from the information terminal unit 100 and requests the computer $500_1$ to execute retrieval.

Thereby, the gateway computer $500_1$ retrieves a connection control table to retrieve whether the communicated information-terminal-unit identification information shows an interrupted line state and communicates the retrieved result to the gateway computer $500_2$. In step SI4, the gateway computer $500_2$ determines whether an answer "present" is returned as the retrieved result from the gateway computer $500_1$. In this case, it is assumed that the determined result is "Yes".

In step SI5, the gateway computer $500_2$ responds to the retrieved result ("present") to establish connection with the information terminal unit 100. Hereafter, the gateway computer $500_2$ relays reconnection between the information terminal unit 100 and the gateway computer $500_1$. Thereby, the information terminal unit 100 resumes data communication with the server computer 700 via the portable-telephone line $R_2$, gateway computer $500_2$, LAN 900, gateway computer $500_1$, and LAN 600. When the determined result in step SI4 is "No", the gateway computer $500_2$ responds a retrieved result "absent".

However, when the determined result in step SI2 is "Yes", the gateway computer $500_2$ retrieves whether a connection control table corresponding to a received gateway IP address is present in its own machine in step SI7. In step SI8, the gateway computer $500_2$ determines whether a retrieved result is "present." When the determined result is "yes" in step S19, the gateway computer $500_2$ establishes connection with the information terminal unit 100 by responding to the retrieved result ("present") and resumes data communication through the portable-telephone line $R_2$. When the determined result in step SI8 is "No", the computer $500_2$ responds to the retrieved result "absent" in step SI10.

As described above, a connection unit (portable-telephone card 810 or PHS card 820) whose radio-field intensity corresponds to a radio-field intensity equal to or hither than a threshold is selected out of radio lines and data communication is performed by using the connection unit and the radio line 200. Therefore, it is possible to prevent data communication from being interrupted due to a low radio-field intensity and shorten the processing time.

Moreover, when a connection unit is mounted on the PCMCIA slot 105, the connection unit is automatically connected to the radio line 200. Therefore, troublesome connection by a user is unnecessary and thus, it is possible to improve the operability.

Furthermore, data communication is continuously performed by using the radio line 200 newly connected after the data communication is interrupted and resumed. Therefore, it is possible to shorten the processing time compared to the conventional case of performing data communication from the beginning after resumed.

Furthermore, data communication can be continuously performed even if the data communication is interrupted and resumed and then, a new radio communication line is connected and the gateway computer $500_2$ different from the gateway computer $500_1$ before interrupt becomes a counterpart. Therefore, it is possible to shorten the processing time compared to the conventional case.

An embodiment of the present invention is described above in detail by referring to the accompanying drawings. However, specific examples of configurations are not restricted to the above embodiment. Modifications are included in the present invention as long as they are not deviated from the gist of the present invention. For example, in the case of the above embodiment, it is also permitted to perform communication control by recording a communication control program for realizing the above functions in a computer-readable recording medium, making a computer read the communication control program recorded in the recording medium, and executing the program. The recording medium includes not only a portable recording medium such as an optical disk, floppy disk, or hard disk but also a transmission medium for temporarily recording and storing data such as a network.

As described above, according to the present invention, a connection unit whose radio-field intensity is equal to or higher than a threshold is selected and data communication is performed by using this connection unit and a radio communication line. Therefore, advantages can be obtained that it is possible to prevent data communication from being interrupted due to a low radio-field intensity and shorten the processing time.

Moreover, the mounted-state monitoring unit automatically connects the connection unit to the radio communication line. Therefore, troublesome connection by a user is unnecessary and therefore, it is possible to improve the operability.

Furthermore, data communication is continuously performed by the connection unit different from the connection unit before interrupt of the data communication by using a radio communication line newly connected after the data is interrupted and then resumed. Therefore, an advantage is obtained that it is possible to shorten the processing time compared to a conventional case of performing data communication from the beginning after the data is resumed.

Furthermore, it is possible to continuously perform data communication even if the data is interrupted and resumed and then, a new radio line is connected and a communication counter part terminal different from a communication counterpart terminal before interrupt serves as a communication counterpart. Therefore, an advantage is obtained that it is possible to shorten the processing time compared to a conventional case.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication controller which selects one out of a plurality of radio communication lines and performs communication using the selected line, said communication controller comprising:
    a slot to which one of a plurality of connection units is connected, the connection units being connected to each one of said radio communication lines;
    a radio-field-intensity acquisition unit which acquires a radio field intensity of each of said radio communication lines;
    a selection unit which selects one of said connection units whose radio field intensity is equal to or higher than a threshold;
    a control unit which provides a control to perform data communication using said connection unit selected by the selection unit and said radio communication line corresponding to said selected connection unit; and
    a mounted-state monitoring unit which monitors a connection state of said connection units,
    wherein, based on the result of monitoring the connection state of said connection units by said mounted-state monitoring unit, said control unit provides said control to perform data communication using said selected connection unit only when said selected connection unit is connected, and said control unit waits until reconnection is designated when data transmission or reception is interrupted because of an error, and continues said data communication starting with unsent data next to the sent data before the interruption, after the reconnection.

2. The communication controller according to claim 1, wherein if data communication is established using one connection unit and the corresponding radio communication line, and if there is an interruption in this data communication, then said control unit connects other connection unit and the corresponding radio communication line and resumes the interrupted data communication.

3. The communication controller according to claim 1, wherein if data communication is established with one communication counterpart terminal, and if there is an interruption in this data communication, then said control unit performs data communication with other communication counterpart terminal.

4. A computer-readable recording medium storing a control program to be applied to a communication controller, wherein communication controller selects one out of a plurality of radio communication lines and performs communication using a selected line, and communication controller is provided with a slot to which one of a plurality of connection units is connected, the connection units being connected to said radio communication lines one-to-one, to make a computer execute the steps of:
    acquiring radio field intensity of each of said radio communication lines;
    selecting one of said connection units whose radio field intensity is equal to or higher than a threshold;
    establishing data communication using said selected connection unit and said radio communication line corresponding to said selected connection unit;
    monitoring a connection state of said connection units;
    performing data communication using said selected connection unit based on the result of the monitoring; and
    waiting until reconnection is designated when data transmission or reception is interrupted because of an error to continue said data communication starting with unsent data next to the sent data before the interruption, after the reconnection.

5. The computer-readable recording medium storing a control program according to claim 4, wherein data communication is continuously performed in the control step by using a radio communication line newly connected after the data is interrupted and then resumed.

6. The computer-readable recording medium storing a control program according to claim 4, wherein data communication is continuously performed with another communication counterpart terminal different from a communication counterpart terminal initially transmitting the data through the selected line before the data is interrupted through a radio communication line newly connected after the data is interrupted and then resumed in the control step.

* * * * *

UNITED STATES PATENT AND TRADEMARK OFFICE
CERTIFICATE OF CORRECTION

PATENT NO. : 6,965,570 B2 Page 1 of 1
DATED : November 15, 2005
INVENTOR(S) : Ikuo Takekawa It is certified that error appears in the above-identified patent and that said Letters Patent is hereby corrected as shown below:

Column 16,
Lines 2 and 9, delete "other" and insert -- another --.
Line 15, delete "and communication" and insert -- and the communication --.

Signed and Sealed this

Second Day of May, 2006

JON W. DUDAS
*Director of the United States Patent and Trademark Office*